United States Patent
Kasabach et al.

(10) Patent No.: US 12,361,348 B2
(45) Date of Patent: Jul. 15, 2025

(54) PERSONAL, PROFESSIONAL, CULTURAL (PPC) INSIGHT SYSTEM

(71) Applicant: The trustee of the Thomas J. Watson Foundation, DBA Watson Foundation, a Delaware charitable trust, comprising J.P. Morgan Trust Company of Delaware, a Delaware corporation, New York, NY (US)

(72) Inventors: Christopher D. Kasabach, Brooklyn, NY (US); Andrew Michael Tikofsky, Oakland, CA (US)

(73) Assignee: The trustee of the Thomas J. Watson Foundation, New York, NY (US)

( * ) Notice: Subject to any disclaimer, the term of this patent is extended or adjusted under 35 U.S.C. 154(b) by 265 days.

(21) Appl. No.: 17/448,740

(22) Filed: Sep. 24, 2021

(65) Prior Publication Data

US 2022/0092515 A1    Mar. 24, 2022

Related U.S. Application Data

(60) Provisional application No. 63/082,865, filed on Sep. 24, 2020.

(51) Int. Cl.
  *G06Q 10/0631*   (2023.01)
  *G06F 16/2455*   (2019.01)

(52) U.S. Cl.
  CPC . *G06Q 10/063112* (2013.01); *G06F 16/2455* (2019.01)

(58) Field of Classification Search
  CPC .................. G06F 16/2455; G06Q 10/063112
  See application file for complete search history.

(56) References Cited

U.S. PATENT DOCUMENTS

| | | | |
|---|---|---|---|
| 11,244,016 B2 * | 2/2022 | Yao | G06Q 10/00 |
| 2007/0300225 A1 | 12/2007 | Macbeth et al. | |
| 2014/0249853 A1 * | 9/2014 | Proud | G06Q 10/10 705/3 |
| 2014/0282153 A1 * | 9/2014 | Christiansen | G06Q 30/0251 715/765 |
| 2015/0007204 A1 * | 1/2015 | Feig | G06Q 30/0254 725/10 |

(Continued)

FOREIGN PATENT DOCUMENTS

| | | | | |
|---|---|---|---|---|
| CN | 109816188 A | * | 5/2019 | G06Q 10/06 |
| WO | 2022067004 A1 | | 3/2022 | |

OTHER PUBLICATIONS

Tien Nguyen, "Enhancing User Experience with Recommender System Beyond Prediction Accuracies" A thesis submitted to the faculty of the graduate school of the University of Minnesota, Aug. 2016. (Year: 2016).*

(Continued)

*Primary Examiner* — Pan G Choy
(74) *Attorney, Agent, or Firm* — GTC Law Group PC & Affiliates

(57) ABSTRACT

The activities and/or behavior of a user may be tracked using electronic devices. The activity and/or behavior data may be analyzed to determine interest and/or potential of the user. Based on the determined interest and/or potential of the user, suggestions for new experiences may be provided to the user to enhance their potential.

17 Claims, 12 Drawing Sheets

(56) References Cited

U.S. PATENT DOCUMENTS

| | | | |
|---|---|---|---|
| 2015/0120593 A1* | 4/2015 | Madhavan | G06Q 10/1053 |
| | | | 705/321 |
| 2015/0331908 A1* | 11/2015 | Duffy | G06F 16/93 |
| | | | 707/765 |
| 2017/0286857 A1 | 10/2017 | Gaon et al. | |
| 2017/0323270 A1* | 11/2017 | Gibbs | G06Q 10/1053 |
| 2018/0268337 A1* | 9/2018 | Miller | G06Q 10/06316 |
| 2019/0034494 A1* | 1/2019 | Bradley | G06Q 10/0637 |
| 2020/0027531 A1 | 1/2020 | White et al. | |
| 2020/0081906 A1* | 3/2020 | Duffy | G06F 16/3328 |

OTHER PUBLICATIONS

Chieh, "Inference of Human Motion using Low-cost Sensors", by Chieh Chien, Doctor of Philosophy in Electrical Engineering, University of California, Los Angeles, 2013. (Year: 2013).*

Feng, "Managing Personal Health Information from Activity Trackers: The Healthy Users' Perspective", by Yuanyuan Feng, Thesis submitted to the Faculty of Drexel University, Jun. 2018, (Year: 2018).*

PCT/US2021/051903 , "International Application Serial No. PCT/US2021/051903, International Search Report and Written Opinion mailed Dec. 23, 2021", Watson Foundation, 8 pages.

PCT/US2021/051903 , "International Application Serial No. PCT/US2021/051903, International Preliminary Report on Patentability mailed Apr. 6, 2023", Watson Foundation, 9 pages.

21873492.9 , "European Application Serial No. 21873492.9, European Search Report mailed Jul. 1, 2024", Watson Foundation, 11 pages.

\* cited by examiner

PERSONAL, PROFESSIONAL, CULTURAL (PPC) INSIGHT SYSTEM

CROSS-REFERENCE TO RELATED APPLICATIONS

This application claims the benefit of priority to U.S. Provisional Patent Application Ser. No. 63/082,865, filed Sep. 24, 2020, entitled "PERSONAL, PROFESSIONAL, CULTURAL (PPC) INSIGHT SYSTEM."

The foregoing application is incorporated herein by reference in its entirety.

BACKGROUND

Field

The present disclosure relates to the analysis of patterns to enhance potential.

Description of the Related Art

The traditional process of developing one's potential is often arbitrary and fails to explore and consider a person's true interests and available opportunities. Individuals often rely on a combination of counselors, teachers, self-assessment methods, and/or peers to provide insights into opportunities, development paths, and the like.

However, due to a severe lack of engaged professional counselors, counselors do not have time to get to know or understand the true character and interest of an individual and can usually only provide generic advice and cannot keep track of the enormous and changing global career landscape. Manual assessment and self-assessment methods are inherently biased and generally only provide a static snapshot of an instant of time or a temporary mood of a user. In most cases, individuals do not receive the support and guidance they need to develop and explore their full potential. In many cases, when individuals do receive guidance, it is often after considerable financial, time, and skill investment, making it difficult to pivot to true interests.

SUMMARY

In some aspects, the techniques described herein relate to a computer-implemented method for identifying or developing potential of a user, the method including: receiving a plurality of free-living activity data of the user captured with one or more electronic devices; sequencing the plurality of free-living activity data into a first multidimensional vector; mapping the first multidimensional vector into a multidimensional space of components; identifying, based on the mapping, at least one goal for the user; synthesizing an experience for the user; and delivering a suggestion of the experience to the user.

In some aspects, the techniques described herein relate to a method, wherein the first multidimensional vector includes values for personal, professional, and cultural components of the plurality of free-living activity data.

In some aspects, the techniques described herein relate to a method, wherein the multidimensional space includes a three dimensional space of with the dimensions representing personal, professional, and cultural components.

In some aspects, the techniques described herein relate to a method, wherein the experience is at least one of an activity, a career path, an educational milestone, or a travel destination.

In some aspects, the techniques described herein relate to a method, further including: sequencing the experience into a second multidimensional vector; mapping the second multidimensional vector into the multidimensional space of criteria; and identifying at least one relationship between the mapping of the first multidimensional vector and the mapping of the second multidimensional vector.

In some aspects, the techniques described herein relate to a method, wherein the at least one relationship includes a distance measure.

In some aspects, the techniques described herein relate to a method, wherein the at least one relationship includes a relative location of the mappings in the multidimensional space.

In some aspects, the techniques described herein relate to a method, wherein the at least one goal includes at least one goal relationship between the mapping of the first multidimensional vector and the mapping of the second multidimensional vector.

In some aspects, the techniques described herein relate to a method, wherein synthesizing the experience for the user includes synthesizing based on the at least one goal.

In some aspects, the techniques described herein relate to a method, further including: receiving user feedback in response to the suggestion of the experience; and updating the at least one goal based on the user feedback.

In some aspects, the techniques described herein relate to a method, further including: identifying activities in the plurality of free-living activity data; and synthesizing the experience based on the activities.

In some aspects, the techniques described herein relate to a method, wherein the plurality of free-living activity data is collected from a wearable device.

In some aspects, the techniques described herein relate to a method, wherein data collected from the wearable device includes physiological data of the user.

In some aspects, the techniques described herein relate to a method, wherein sequencing the plurality of free-living activity data into the first multidimensional vector includes comparing fee-living data against a library of labeled free-living data.

In some aspects, the techniques described herein relate to a method, further including: synthesizing a second experience for the user; delivering a suggestion of the second experience to the user; receiving an indication of a selection between the suggestion of the experience and the suggestion of the second experience; and updating the at least one goal for the user based on the received indication.

In some aspects, the techniques described herein relate to a method, wherein the plurality of free-living activity data includes a sequence of free-living activities, and wherein synthesizing the experience for the user includes synthesizing based on the sequence.

In some aspects, the techniques described herein relate to a method, wherein the plurality of free-living activity data includes at least one of: user location, duration of activities, choices between activities, temporal relationship between activities, type of activity, number of other participants in the activity, or level or participation in the activity.

In some aspects, the techniques described herein relate to a method, further including: querying at least one database for activity information associated with the plurality of free-living activity data; and sequencing the plurality of free-living activity data into the first multidimensional vector based on the activity information.

In some aspects, the techniques described herein relate to a method, wherein the activity information includes data about a locations associated with the plurality of free-living activity data.

In some aspects, the techniques described herein relate to a method, wherein the activity information includes data from social media associated with the plurality of free-living activity data.

BRIEF DESCRIPTION OF THE FIGURES

The disclosure and the following detailed description of certain embodiments thereof may be understood by reference to the following figures.

DETAILED DESCRIPTION

Figure 1:
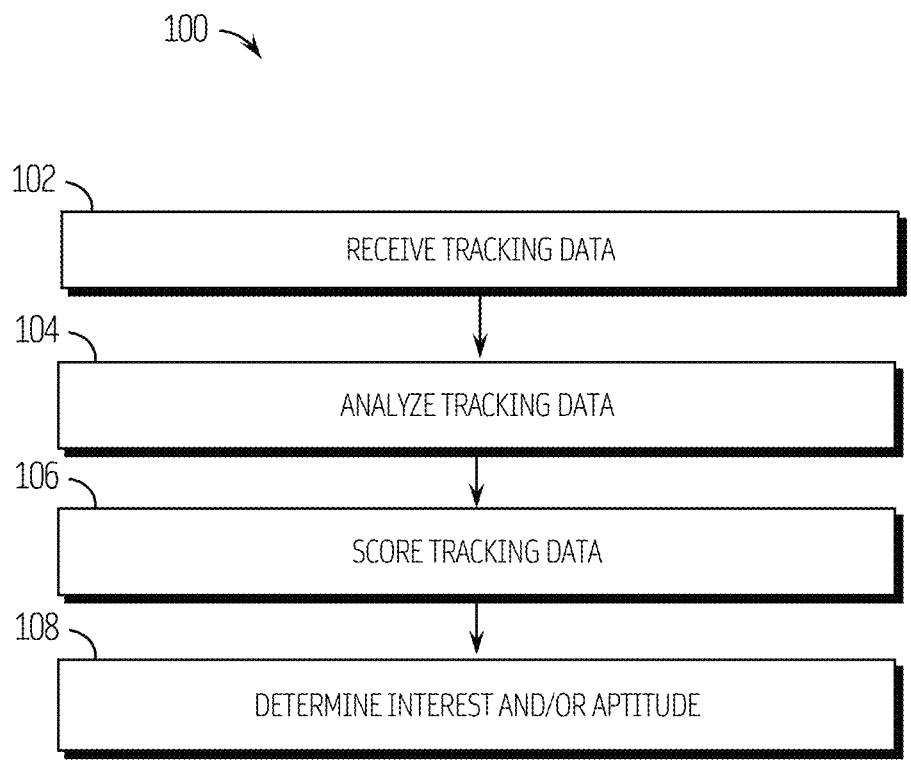
FIG. 1 depicts aspects of a method of the PPC system.

Human potential may include various facets. In some cases, the potential may include personal potential. Personal potential may relate to the ability to identify and act on one's interests, strengths, and values. Potential may include professional potential. Professional potential may reflect the ability to identify and act on meaningful career paths. Potential may include cultural potential. Cultural potential may reflect the ability to thrive in unfamiliar communities, local and global.

Development of potential may include the development of one or more of personal, professional, and cultural potential (also referred herein as dimensions or characteristics). Individual's ability to develop their potential may be limited by the individual's exposure to different ideas, paths, careers. Individual's ability to develop their potential may be limited by the individual's understanding of self. Individual's ability to develop their potential may be limited by a lack of cultural awareness, the ability to access or understand new communities, local or global Systems and methods are described herein that aid individuals in developing their potential. Systems and methods include an information system that ingests user behavior and/or activity. The behaviors and/or activities may be stored, processed, and sequenced to help expand the vision and develop the potential of a user. Based at least in part on the ingested user data, the system may output one or more suggestions for new activities, assessments of personality, assessment of strengths and weaknesses, assessment of skills, behavioral statistics, career suggestions, educational opportunities, and the like.

In embodiments, a system that monitors the behavior and/or activity of a user may be used to enhance and build the potential of users. In embodiments, participation and enrollment in an individual's potential building system may be voluntary. A user may create an account and provide personal information. Information may include one or more of a current state, future goals, self-assessment related to strengths and weaknesses, fears, history, and the like of the user. In some cases, a user may be required to provide little or no information about themselves and may only provide an identifier for associating the user with collected data. Enrollment may include providing permissions for gathering data. In some cases, a user may provide permissions for the system to collect information about the user from various other systems or applications such as third-party media services, websites, camera systems, surveillance systems, and the like. In some cases, a user may provide permissions for the system to collect information about the user from their personal devices such as phones, watches, activity trackers, computers, vehicles, cameras, wearable devices, and the like. A user may specify what data may be collected, when, how long it can be stored, how it can be stored, and/or similar restrictions. The data obtained by the system about the user may track the behavior/activities of the user.

User behavior may be ingested/collected via one or more electronic devices that capture data related to a user's activities and/or behavior over a period of time. Data may include location data (i.e., GPS data), audio data, video data, image data, social profiles, search queries, purchase history/habits, movement, the physical state and/or physiological data of an individual (heart rate, temperature), and the like. The data may be monitored and collected continuously, periodically, and/or in response to one or more trigger signals. In embodiments, data may be collected from sensors, databases, and the like.

In embodiments, data may be collected during free-living and may capture the actual behaviors and experiences of the user. Data collection may be passive and not require any active input or feedback from a user. Systems and devices may automatically collect data and transmit data to one or more servers or cloud systems for analysis. In embodiments, data may be collected and entered from another trusted individual, such as an advisor or instructor.

Free-living data collection may relate to data collection that captures the daily activities of a user, and the user is not required to fill out special forms, take tests, attend special evaluation meetings, although these elements could also be part of the data collection, they may not be required. Data collection during free-living may capture at least 5% of the daily activities of a user. In some embodiments, free-living data capture may capture at least 20% or 50% of the daily activity of a user.

In some embodiments, data collection may include aspects of active data collection and may require engagement from a user. Active data collection may require a user to periodically, randomly, and/or in specific situations, provide feedback, answer questions, or perform one or more specified activities.

In embodiments, the system may ingest or collect data that provides information about what an individual is learning, what types of objects and/or ideas the individual comes in contact with or is exposed to, locations, how much time users spend related to specific tasks, temporal relationships between activities (i.e., how often user performs activities related to a topic or category), and the like. Data may relate to what activities the user is performing in their free time and what activities they perform at other times, such as school, work, or other structured environments.

In embodiments, the system may process ingested data to determine a profile of the user. The profile may include data related to the inferred strengths, interests, and values of the user. Based at least in part on the profile of the user, the system may provide recommendations as to what activities the user may enjoy, what activities or opportunities the user should explore to enhance their potential. In some cases, suggested activities or opportunities may not relate to an activity the user may not have experienced or has not been exposed to. Suggestions and analyses may be performed and provided to a user with constructive activities, suggestions, and analyses that can be useful to the user to enhance their potential.

In embodiments, free-living behavior and activity data may be gathered over days, months, or even years.

In embodiments, the profile of a user may be determined by analyzing patterns, relationships, associations of different behaviors and activities of the user.

In embodiments, data analysis may include one or more levels. In some cases, the first level of analysis may be based on the tracking of time spent on activities. Activities may be tracked and/or categorized. The time spent on each activity may be monitored. The system may determine which types of activities the user spends the most time on, which activities or types of activities the user spends the least amount of time on, which activities or types of activities the user never experiences, and the like. Based at least on the monitored time, the analysis may determine aspects of the profile such as general interests, daily schedule, activity level (i.e., how busy the user is, does the user have free time to try new things), and the like.

Another level of analysis may include a deeper examination of the nuances of the activities of a user. In many cases, an activity may relate to many types of interests and categories of interests. An instance of a behavior/activity may relate to dozens or even hundreds of different possible interests. For example, the activity of watching a sports movie may be associated with interests in sports, film, cinematography, history, geography, and possibly hundreds of other interests. An activity of watching a sports movie may be analyzed in the context of other activities and behaviors that occurred in the past before watching the movie and/or activities that occurred after watching the movie. In some cases, the context may include activities that occurred days or even months before or after the activity of watching the movie. An analysis system may determine one or more patterns that may have led to or may have been associated with watching the movie. In some embodiments, a particular movie may be classified according to various scenes, interests, trends, locations, social media context, history, and the like. Classified aspects may be compared to aspects of previous or future activities of a user. For example, if parts of the sports movie are identified as being associated with a historic sports arena location, the user's previous locations may be analyzed to determine if they correspond to any locations in the movie. A correlation of locations may further include analysis to determine possible reasons or activities that were associated with when the user was at the location. Activities at the location may provide insights as possible interests that led a user to watch the sports movie. For example, if the activity at the location related to the movie was associated with a history lecture, it may be possible that the user may have watched the movie due to their interest in history.

Captured free-living data may be analyzed to determine a user's inherent interests and/or aptitude based on a nuanced analysis of the categorization of the type of activities. In some embodiments, the analysis system may analyze relationships between data in time to identify context and nuanced aspects of interest during a behavior. In embodiments, hundreds or thousands of correlations, patterns, and associations between behaviors and activities of a user may be determined. These correlations may be used to identify long-term patterns in user behavior.

In yet another level, the analysis may include determination and analysis of the choices a user makes. Choices may include decisions between alternative activities. The analysis may include the determination of available activities to a user and a determination of which activity the user selects. In some cases, the calendar of a user may be analyzed to determine if there were conflicting or double-booked dates and what choice the user makes with respect to the conflicts. In another example, the social media or messaging content associated with a user may be analyzed to determine what activities or opportunities were presented to a user and which activities and opportunities the user participated in or took advantage of. For example, various friends may propose different weekend activities to a user using messaging, email, and the like. Tracked free-living activities of the user may be analyzed to determine which one of the proposed weekend activities the user selected. In embodiments, decisions made by the user may reflect the interests or preferences of the user. The possible choices a user is presented with may be categorized. Using decisions between different categories, the preferences of the user may be determined based on how often one category is selected over another.

In another example, the analysis of the choices the user makes may be based on location tracking and determining what activities are available in the location of the user at the time of the user and what types of activities the user selected. For example, if user data indicates that the user is next to an art museum and a technology museum but only enters the technology museum, it may be determined that the user may have made a choice between two different possible interests.

In embodiments, a choice selection of a user may include data analysis of the user's location, calendar, activities, messaging, and other content.

In yet another level, the analysis may include the determination of information retention of a user. In many cases, the types of information a user retains or notices may be related to the interest and/or aptitude of the user. In one embodiment, information retention of a user may be determined with queries or questions directed at the user. For example, after watching a movie, the user may be queried with a question about what they liked best about the movie or may be asked to describe their favorite or the most interesting portion of the movie. Based on what aspects the user remembers and describes in the most detailed inferences as to what the user was paying attention to while watching the movie can be determined. In another example, activity tracking data of a user may indicate that a user visited a city and took a tour of the city. The user may be prompted to answer one or more questions related to the information they would have been presented during the tour to determine what type of information the user retained or remembered from the tour. In one example, the questions may be tailored to determine the type of information or categories of information the user retains. For example, different questions may be related to numerical data, historical information, sports information, and the like. Depending on which questions the user answers or selects to answer, the user's aptitude and interest in a different type of data and categories of information may be determined and used to build a profile of the user.

In embodiments, the analysis on one or more levels described herein may be used to build aspects of a user profile.

In embodiments, the system may use the profile data to suggest new activities, provide a summary of aptitudes, suggestions for career paths, and the like.

In embodiments, user tracking of data may be used to provide comparison and analysis of user activity data with respect to one or more of a user's goals or ambitions. In some cases, users may have well-defined goals or ambitions with respect to knowledge, career, financial success, health, and the like. In some cases, users may be naïve and/or unaware of the daily habits, work ethic, focus, interests, aptitude required to meet the goals. In embodiments, the system may identify aspects of patterns of behavior or activity that are associated with one or more goals of a user. The system may provide feedback as to how the user may consider changing their behavior and/or activities to have a better chance of reaching their goals.

In one embodiment, the system may track the daily activities and behavior of users that have achieved success with respect to one or more goals. The behavior of users that may be considered to be financially successful, knowledgeable, and the like may be tracked. In another example, the behavior of users that have shown success at certain professions or careers may be tracked to determine what aspects of their activities, and in some cases, their interests and/or aptitudes, are correlated with their success in their career.

In some embodiments, the patterns from the behavior of users may be used to suggest connections to other users who are on a similar journey, building relationships, cohorts, and communities.

In some embodiments, hundreds or thousands of free-living activity data of users may be tracked to determine patterns of behavior and/or determined interests from the activity data that correlate to users who achieved a goal, exhibit success in their career, or other endeavors.

In embodiments, the daily free-living activity of users to achieve a goal or success may be inputted to one or more machine learning models and/or other data analysis models. The models may ingest raw activity data and/or the profile data to determine activity patterns, profile patterns, and the like that are correlated to or related to achieving the goals, success in career, and the like.

In embodiments, users who select one or more goals, career objectives, or other criteria may receive feedback with respect to how their profile data and/or activities correlate and/or compare to users who have achieved the same goals, career objectives, and the like. For example, users who express a goal of having a career as a doctor may compare their profiles and/or activity data to other users that have achieved success as a doctor. The comparison may determine differences in interest and/or aptitudes of the user and the other users. In some embodiments, the comparison may determine differences in the daily activities, types of activities, and the like between the user and the other users. For example, in the case of a user having the goal of having a career as a doctor, the comparison may reveal that being a doctor is typically associated with an interest and/or aptitude in mathematics while the user's profile does not show such interest and/or aptitude. The difference in the profile data may result from the user not being exposed to math subjects. In embodiments, based on the comparison and profile data of the user, the system may suggest activities and/or changes in behavior that would enable the user to gain more exposure to math. In embodiments, based on the comparison and profile data of the user, the system may suggest activities and/or changes in behavior that would enable the system to evaluate if the user possesses the interest and/or aptitude in math that may be required for success as a doctor.

In another example, in the case of a user specifying the goal of having a career as a doctor, the comparison may reveal that users who are successful doctors read for at least two hours a day while the user reads less than 10 minutes per day. The comparison may be used by the system to suggest to the user to increase their daily reading time in order to train themselves to slowly read more every day and increase their potential.

In embodiments, collections of data, analysis, and suggestions may be automated and may not require human intervention and/or monitoring. In some cases, the types of analysis performed and/or types of suggestions provided may be based on the user's age, locations, background, education level, and other factors. Filter and setting may be provided such that the suggestions provided by the system are age-appropriate and/or appropriate and compatible for the user.

In some cases, the type of data capture performed (i.e., time of day, fidelity, sources), the type of data analyzed may be based on age groups, demographics, location, and the like. The systems and methods described herein may be used by younger people to find their interests and explore initial career paths. The systems and methods described herein may be used by adults to find new career paths, to pivot to new opportunities, to exploit their skills and experience in new fields, and the like.

In some embodiments, one or more of the analysis, data collection, or suggestions may be monitored by a human. The human in the loop may verify that the system is operating correctly and providing appropriate suggestions. In some cases, such as when the system fails to find appropriate suggestions, a professional counselor or coach may be used to supplement or replace the suggestions provided by the system. In some cases, user feedback or triggers may initiate a human review of the system analysis and suggestions. In some cases, a user may select or query the system to provide coaching or supervision from a person qualified to provide support and feedback to the user.

In embodiments, the system may provide suggestions for activities and/or behavior changes and monitor the user's activities and/or behavior to determine which if any of the suggestions were implemented, partially implemented, attempted, and the like. Based at least in part on the user's implementation of the suggestions, the system may adjust the types of activities and/or behavior changes that are suggested to the user. In embodiments, the system may learn or determine from the history of implemented suggestions the preferred time of day that the suggestions require for completion, the amount of continuous time required (i.e., if a continuous block of time is required or if the suggestion may be completed in small chunks over a longer period of time).

In some embodiments, a user may specify settings for what type of suggestions may be provided. In some cases, the user settings may include a selection such that only suggestions that can be accomplished without spending money are provided. In another example, settings may specify a level of suggestions that may be provided. The levels of suggestions may relate to how intrusive the suggestions are with respect to the user's current behavior and/or activities. For example, level one suggestions may alter less than 5% of a user's behavior and/or daily activities with respect to a 24 hour or 7 day period. Level two suggestions may alter between 5% and 10%, and additional levels may specify that a larger percentage of a user's daily or weekly behavior and/or schedule be modified to accomplish the suggestions.

The methods and systems described herein should be distinguished from other systems and methods, such as those that are used to deliver marketing material to a user or influence a user to purchase a product or service. Unlike other systems, the methods and systems described herein avoid influencing or manipulating a user to make a choice. In contrast, the systems and methods described herein strive not to influence a user but to enhance the user's potential by identifying true and unbiased interests and/or aptitudes of the user.

In embodiments, users may be provided with a portal, application, website, and the like, that may provide a dashboard related to the user's captured behavior, analysis, and suggestions. In some cases, the dashboard may include one or more visualizations and/or graphics related to what data was captured, statistics of the data (such as related to the different levels of analysis described above). The dashboard may include lists of suggestions, metrics related to reaching a goal or developing their potential.

In embodiments, the user may review the captured data and/or profile data and provide an assessment of the accuracy of the analysis and data. The user may indicate if the data and/or analysis appears accurate or not accurate. The user may indicate a range of accuracies such as numbered rating or a start rating. In some embodiments, the user may indicate the accuracy of the whole profile and/or individual aspects of the profile and/or individual aspects of the analysis. The system may, based at least in part on the user accuracy rating, modify the analysis, profile, interest ratings, and the like.

In embodiments, users may be provided with daily, weekly, or periodic summaries of their tracked activities and/or behaviors, changes in activities and/or behavior over time, and the like. The summaries may be provided via email, message, application, alerts, and the like.

In embodiments, the system may be used by individuals for career development. In embodiments, a user may specify their current occupation and aspects such as salary, working conditions, what they like about their job, what they dislike about their job, and other related aspects of their occupation and/or their employer. The system may track the behavior and activities of the user and determine their interests and aptitudes of the user. In many cases, a user's skills from their current occupation may be transferrable to many other occupations. In many cases, with minor additional training or exposure to additional information, users may have many more occupations and career options than they realize. Options may include careers that appear to be a better fit with respect to the user's determined interests and aptitudes, more lucrative, different locations, and the like. In some cases, the system may provide, based on user input, determined interest and aptitudes, paths to a new occupation or career. The new occupation may be suggested such that it matches the user's determined interests and aptitudes. The system may determine relationships and transferrable skills between the user's current occupation and possible paths to other occupations and careers. In some cases, the system may provide suggestions for additional training, activities for gaining additional skills, and other opportunities to transition the skills from the current occupation to a new occupation. The system exposes the user to new opportunities and provides the user with suggestions for new activities and ways of changing their behavior to update their current skills to better match what is expected in a new occupation.

In embodiments, the system may generate/determine novel professions and opportunities. The system may determine opportunities professions that include established vocations and careers as well as determine other new possible opportunities. New professions and opportunities may be derived by determining creative adjacencies of established professions and opportunities. New professions and opportunities may be determined from combinations of established careers. New professions and opportunities may be determined by determining voids between known professions and opportunities.

In one example, a global table may be derived that represents known careers and opportunities. A global table may be a data structure that includes elements that capture known and/or established careers and opportunities along with their associated properties. The associated properties may include data related to the skill required, personality, experience, interests, and the like. In some cases, the associated properties may include free-living data or characteristics of free-living data that may be associated with each element.

In one example, new careers and opportunities may be derived from the global table by considering combinations of known and/or established careers and opportunities in the table. The system may determine/derive data for combinations of established careers and opportunities. The system may determine what skill, personality, experience, interest, and the like may be necessary for the combination based on the data associated with each individual career and/or opportunity. Exploring combinations of known careers and/opportunities may be used to synthesize or determine possible new careers and opportunities that may require a new set of skills, personality, experience, interests, and the like.

In another example, new careers and opportunities may be derived by determining gaps or voids between elements in the global table. Gaps in required skills, personality, and the like between elements in the table may indicate there may be unexplored opportunities for the combination of qualities. In some embodiments, data captured from free-living may be used to determine the closest element in the global table that match the captured data. In some cases, the system may try to synthesis (combine two or more elements from the table) to determine if a combination of elements from the table may closely match the captured data. In some cases, the system may determine if the user's captured data falls between properties associated with elements in the global table. The system may provide recommendations to users about exploring areas or possible opportunities that may lie between or may be a combination of known or established careers, professions, occupations, and/or opportunities. In embodiments, the system may be used by institutions to recruit persons matching desired profiles, to monitor and better understand their members, to develop and guide the potential of their members, to administer development programs, and the like.

In embodiments, educational institutions may specify qualities they are looking for in their student body. In embodiments, the system may match the institution with students that match the desired profile.

In embodiments, educational institutions may monitor their student body or a representative subset of their student body to determine if they are exposed to the experiences and education the institution is striving to provide. An institution may monitor students to determine they have the time and opportunity to study, experience other ideas, extracurricular activities, and the like. An institution may use the system and analyze data with respect to the behaviors and activities of their student body to ensure that the student body is receiving a well-rounded education. An institution may use the system to ensure that students are exposed to a diverse set of ideas and points of view. In many cases, it may be useful to expose engineering students to art and art students to more analytical subjects and ideas associated with engineering. An institution may use the system to adjust its curriculum, student loads, available activities, and the like. For example, monitored data of students may reveal that students spend almost all of their time going to classes and studying in their dorms. For some institutions, this may indicate that the academic loads on the students may be too high, and the institution may reduce class time or other loads to ensure students have time to experience other programs and get exposed to a diversity of ideas and extracurricular activities. Institutions may learn new things about the behavior of their student body in terms of how they spend their time, how they use technology, how they socialize, how different programs provided by the institution are utilized, and the like and adjust their programs to match the behaviors of the students.

In embodiments, the system may be used to administer programs and monitor the progress of a program and/or the progress of an individual in the program. In embodiments, programs such as academic stipends may be administered remotely by monitoring user's activities and behaviors. In embodiments, stipends may be related to unlocked goals, such as an indication that a user explored unique combinations of ideas, or spent time developing or exploring one or more ideas. Stipends may be awarded to students to explore their ideas. Stipends may be paid out incrementally based on the determined time the student spends their time exploring their ideas and the depth of their exploration (for example, analyzed based on the different levels of analysis described above).

In embodiments, the system and methods described herein use real free-living data to determine unbiased interests and aptitudes of a user and provide ways to enhance the potential of the user. In some applications, however, there may be one or more incentives for a user to manipulate aspects of their monitored behaviors and activities to make it appear as though the user has interests and aptitudes that are different from their true interests and aptitudes. For example, a user may want to appear like they are interested in history, may instruct other persons to take the user's device that is tracking the behavior of the user. Other persons may perform behaviors and activities that are consistent with a false profile the user is trying to project. In embodiments, the system may use one or more fraud detection methods to determine that the collected data is consistent and may be attributed to the actual behavior of the user. In embodiments, the system may use one or more machine learning models to identify unusual patterns in a user's behavior. The patterns may be flagged and further investigated by a human.

In embodiments, the system and methods described herein may use data from various sources for analysis of data and/or providing suggestions. In embodiments, data from the Department of Labor, social media, search engines, messaging systems, image databases, and the like may be utilized.

In embodiments, tracking and analyzing user behavior and/or activities may include binning and/or categorizing the behavior and/or activities with respect to three or more categories. In one embodiment, three categories may include a Personal category, a Professional category, and a Cultural category. Each behavior and/or activity may be binned or categorized into one or more of the categories. Categorizing and/or binning an activity and/or behavior into a category may relate to how the activity and/or behavior relates to each category. In embodiments, each category may include additional levels of subcategories for further categorizing each activity and/or behavior.

In embodiments, a user profile may include or may be associated with a data structure that includes a list, table, or other data structure of categories and subcategories of behaviors and/or activities. When the activity and/or behavior of a user is tracked by the system, the data structure may be updated based on the relationship of the activity and/or behavior to the categories and/or subcategories of the data structure. In embodiments, updates to the data structure may include incrementing a counter associated with a category and/or subcategory. In some embodiments, updates to the data structure may include storing data with respect to the time, location, duration, and the like of the activity and/or behavior.

In embodiments, the system may analyze the updates to the data structure to provide suggestions to the user. Based on the data in the data structure, the system may determine the user's interests and/or aptitudes and may provide suggestions to the user for new activities and behaviors.

In embodiments, the user's interests and/or aptitudes may be based on scoring of the data in the data structure. Scoring may be based on the counters, time data, location data, and the like that was updated for the categories and/or subcategories. Categories and/or subcategories that are marked with higher counters and/or more time may be scored higher than categories and/or subcategories that are marked with lower values of counters and/or time. In many cases, categories and/or subcategories with the highest scores may correlate to the interests and/or aptitudes of the user.

In embodiments, the system may provide suggestions to the user based on the scoring of the categories and/or subcategories. The system may suggest activities and/or behavior that relates to one or more categories and/or subcategories that have the lower scores.

For example, an activity of a 19-year old user may be monitored by the system. The activity may include watching Our Planet, a documentary about earth's beauty and climate change on a mobile tablet. The system may analyze the activity with relation to one or more categories and/or subcategories. The analysis may include the following updating and marking of the categories and subcategories:

---

Personal:
    Sensitive, Responsible, Environmentally Conscious
Professional:
    Natural Science>Biological Science>Marine Biology
    Natural Science>Biological Science>Oceanography
    Physical Science>Psychology>Environmental Psychologist
    Political Science>Public Policy
    Business Management>Aquaculture
    Law>Environmental Law
    Art>Filmmaking>Cinematography
Cultural:
    Africa>Madagascar>Manombo Reserve

---

Continuing with the example, the system may further analyze previously monitored activity and/or behavior data to determine data relationships between the activity of watching the documentary and previous activities. Analysis with previous activities may indicate that the 19-year-old spends an extensive amount of time in the wilderness of Montana hiking and swimming. The system may identify hiking locations gathered through the phone. The system may identify the swimming activities gathered through a wearable device. The system may identify outdoor-related scenes from photographs gathered from posts on social media. Analysis and relationships between data can be used to build the profile of the 19-year old user and/or to update the categories and subcategories of the user. For example, the historical data may be used to update the markings with the following:

Personal:
   Active, Independent
Professional:
   Organization>Government>Montana Department of Environmental Quality
Cultural:
   Ethnicity>Indigenous People of the Great Plains>Blackfeet
   Sports>Wild Swimming Communities The markings may be used to identify specific organizations and/or opportunities that match the data gathered and are in proximity to the locations identified for the user.

The systems and methods described herein may be used to synthesize new experiences for a user that enhance or expand the user's personal, professional, and cultural dimensions. New experiences may identify new novel professional pathways, new cultural experiences, new educational pathways, and the like.

Continuing with the example above, viewing Our Planet, engaging in wilderness experiences and other collected data, a novel professional pathway may be generated for the user that synthesizes a new suggested experience for the user. In one example, a new experience may be professional pathway towards a JD/MS in Law and Biology. A novel cultural experience may be wild swimming a local Montana body of water, collecting water samples along the way and emerging from the water to do after school programs and educating children with the results, sharing the source of contaminants and contrasting today with how the body of water was used when indigenous people settled in the area.

In another example, experience suggestions may include extending the PPC dimensions of experiences by suggesting an experience to pursue the same activities in another state and still further could be the system proposing scuba certification and suggesting regions where global warming has had even wider impacts on water quality. For example, based on updates to the user profile that show increased Spanish proficiency from online language coursework and bookmarks of several news articles about global warming, the user may be shown a world map with focus on Spanish-speaking coastal communities where sea temperatures are killing wildlife—such as Costa Blanca where 78% of coral reefs have been damaged. This forms a novel research pathway to inform their personal, professional and cultural potential.

In another example, a 21-year old student may be monitored by the system. The activity of the student may include a visit to the New York Stock Exchange. Location data about the user may be identified from GPS location data of the user's phone. Additional location data may be identified from a social media post that provides a reference to the location. In some cases, a photo taken by the user may be analyzed to identify landmarks or other features to identify the location of the user. The system may identify aspects of the activity from photos, social media posts, activity trackers, user choices related to the activity, information retention related to the activity, and the like. For example, the system may identify sentences or conversations from messages that user shared with others to identify aspects of the visit to the New York Stock Exchange that were discussed, shared, or found interesting. For example, a social media post with a statement such as "This building is amazing, who designed it?" might indicate that the user is more interested in the architecture of the location than the financial aspects of the visit. In another example, a message or a post such as "How do I get a job here?" may be interpreted to mean that the user is interested in a career in finance. In some cases, the analysis may include web searches or purchases following the visit. Receipts of purchases found in a user's email account may be analyzed with respect to what souvenirs the user purchased. Web searches after the visit may indicate what aspects the user found most interesting and would like to learn more about. For example, searches related to electronic trading after the visit may indicate that the user is interested in the computer and information technology related to finance.

The analysis may include the following updating and marking of the categories and subcategories:

Personal:
   Analytical, logical, systematic, efficient
Professional:
   Business>Finance>Securities>
   Computer Science>Computational Finance
   Architecture>

In embodiments, the data captured for a user with respect to the different categories and/or subcategories may be analyzed using a machine-learning algorithm to determine the interests and/or aptitudes of the user. In embodiments, the machine learning algorithm may be a neural network, may be recursive, may have an architecture defined by matrix equations, or may be initialized with specific randomization techniques (e.g., Xavier, etc.). The machine learning algorithm may learn by backpropagation of errors, feedback, iteration, or by providing a known input and the desired output. The machine learning algorithm may improve the model by adjusting weights, rules, parameters, or the like.

In embodiments, the machine learning algorithm may be a classification model. In this model, input data may be labeled manually or automatically. In embodiments, the machine learning model may be trained on user profile data that has been manually labeled or analyzed as corresponding to one or more interests and/or aptitudes. The machine learning model may be trained to classify data structures with similar categories and/or subcategories updates as relating to users with similar interests and/or aptitudes.

FIG. 1 depicts some aspects of a method for determining the interests and/or aptitude of a user. In step 102, tracking data of a user may be received. The tracking data may include daily activity data of a user captured by one or more sensors, received from one or more other systems, and the like. The tracking data may include activities, behaviors, locations, purchases, media content consumed, social media activity, photos captured, sound data, and the like related to the user. In step 104, the tracking data may be analyzed. The analysis of the data may include different levels of analysis, as described herein. Analysis of tracking data may include analysis and tracking with respect to one or more categories and/or subcategories as described herein. In step 106, the tracking data and/or the analysis results of the tracking data may be scored. In step 108, the system may determine the true interest and/or aptitude of the user based at least in part on the scoring.

Figure 2:
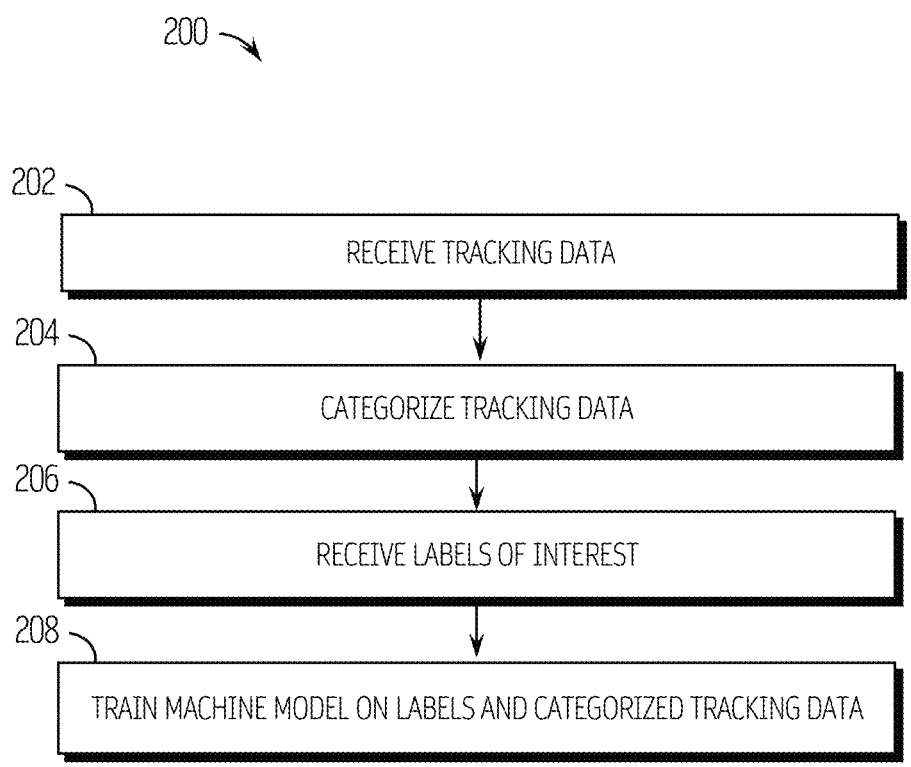
FIG. 2 depicts aspects of a method of the PPC system.

FIG. 2 depicts some aspects of a method for training a system to determine the interests and/or aptitudes of a user using tracking data. In step 202, tracking data of a user may be received. The tracking data may be categorized and/or analyzed in step 204 using different levels of analysis and/or categories described herein. In step 206, labels of interest and/or aptitude may be received. The labels may indicate determined or verified interests and/or aptitudes of the user corresponding to the tracking data. In step 208, the tracking data, the categorized data, and the labels may be used to train a machine learning model to recognize the interests and/or aptitudes of other users from their tracking data.

Figure 3:
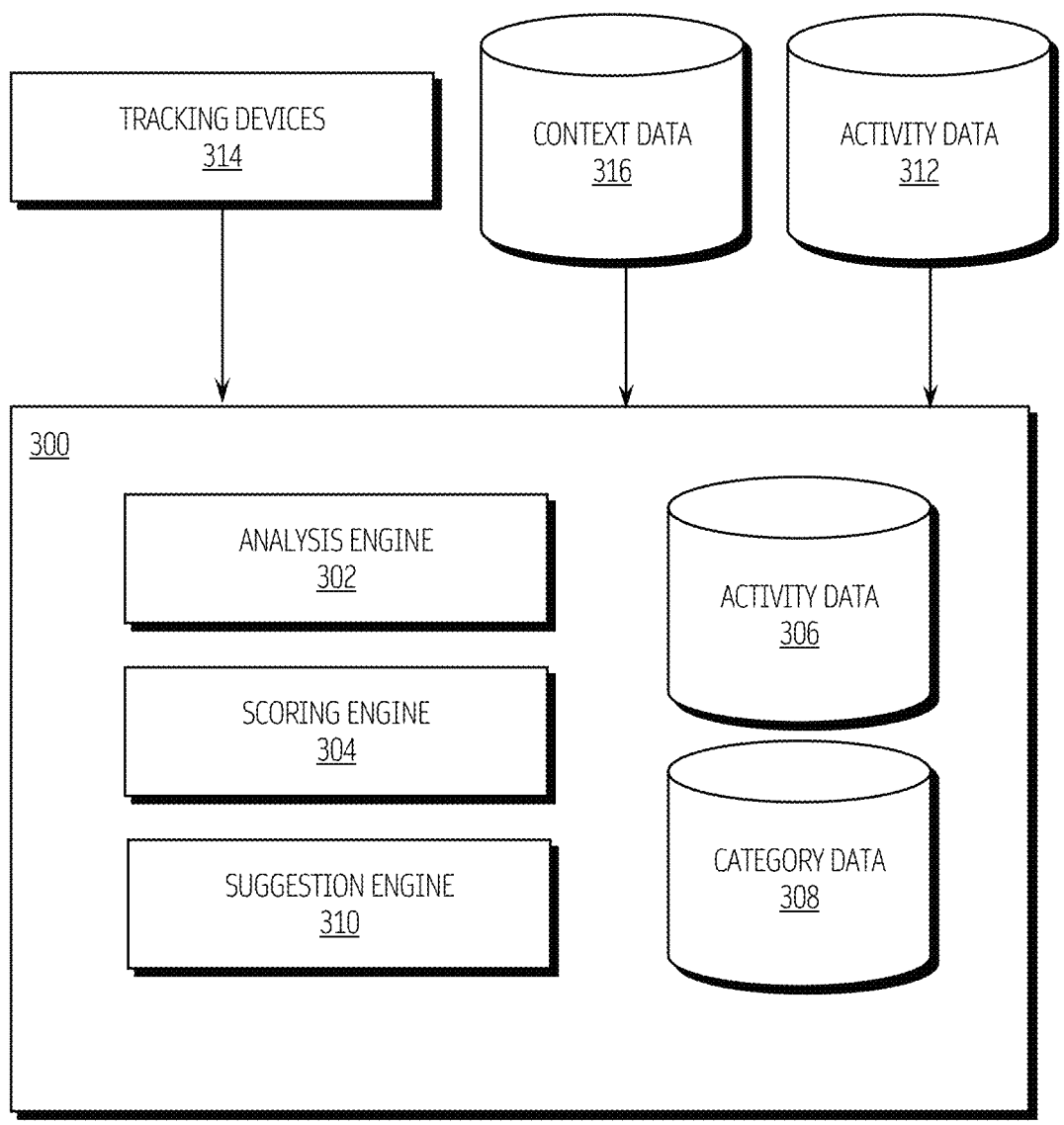
FIG. 3 depicts aspects of the PPC system.

FIG. 3 depicts some aspects of a system for tracking and analyzing user data to enhance the potential of the user. The system may include one or more tracking devices 314 that may include various sensors that track the position, location, activity, behavior, status, sounds, photos, and the like related to a user. Sensors may be part of a user's device and may capture data related to the user. In some cases, a user's device may be used as an identification beacon that provides identification of the user's presence or activity to other systems and sensors in other locations.

The system may include additional sources of data such as context data 316 and activity data 312 from other sources such as social media systems, web systems, other user tracking systems, and the like. Additional sources may include data knowledge bases that provide data and relationships between relevant data such as locations, activities, people, interests, and the like. A data knowledge base may be continuously or periodically updated using tracked user data. Elements such as possible activities and themes of the activities associated with a location may be added to the knowledge base when new content or activity is detected in tracked data of a user.

Data from tracking devices 314 and other data sources 316, 312 may be provided to one or more devices 300 to analyze, score, and provide suggestions to a user. The devices 300 may include local storage for storing activity data 306 from other sources or captured by the device 300 as well as category data 308 used to analyze the activity data 306. In some embodiments, the collected data may be organized into a data structure such as a knowledge base for each user. The knowledge base may be a graph that represents items and relationships between items. Items may include activities, locations, interests, decisions, and the like associated with each user.

The devices may include an analysis engine 302 to analyze the activity data and determine what categories and/or interests the activity corresponds to. In embodiments, the analysis engine may include a filtering and normalization component. The filtering and normalization component may be configured to normalize captured data based on age, location, cultural background, economic background, and the like of the user. In some cases, certain activities and behaviors of a user may be dictated by the geographic location or customs associated with a location, for example. Some behaviors or activities for certain locations or groups of users may not be associated with any interest in one location but may be highly correlated with interest in another location or group of users. For example, riding a bike in Denmark is a daily activity and a ubiquitous mode of transportation and may not be reflective of a user's interest, while the activity of riding a bike in Texas is likely associated with a leisure activity and may be representative of a user's interests. In embodiments, the filtering and normalization component may compare activity data of users in a similar location, age group, demographic, and the like to identify activities and data that is likely representative of mundane and normal activity. In embodiments, data analysis techniques, such as clustering analysis and other statistical analysis, may be used to determine if some activity data is associated with locations, specific user groups, and the like and likely not associated with the interests of the user. In some embodiments, the system may identify other users within a distance threshold and compare activities to determine activities that are customary in the location. The identified customary activities may be ignored and/or flagged or assigned a score that is representative of their significance.

In embodiments, the analysis engine may include a predictive value component. The predictive value component may be used to identify which activities, the sequence of activities, types of features in captured data, and the like are representative of true interests and/or influential to the assessment of the user. The system may use predictive modeling to identify elements or actions, the sequence of actions that may be predicted to be influential to the assessment. The model may be trained to identify specific sequences or patterns in activity data. In some cases, the predictive value component may analyze tracked data in real-time and initiate one or more collection and analysis routines when an influential activity is likely being tracked. In some cases, when an influential activity is detected, the fidelity of sensor readings may be increased and/or more sensor readings analyzed. The captured data during influential activities may be scored or weighted higher than other data. In embodiments, the predictive value component predicts influential activities based on a predictive model. The predictive model may be trained on one or more knowledge bases associated with users to find patterns or distinguishing features between different knowledge bases and/or captured data and the correlation of the differences to known or verified interests. The predictive models may be periodically or continuously updated according to an accuracy assessment.

In embodiments, the analysis engine may include a sequence analyzer to determine patterns or correlations between data points. The sequence analyzer may identify relations in events that occurred at different times. The sequence analyzer may be a machine learning model or a neural network that is trained to identify related events in time. The related events may be flagged and analyzed to determine if there was a causal relationship between the events and may identify one or more potential interests associated with the relationship.

The devices may further include a scoring engine 304 to score the output of the analysis. The scoring engine may receive predictive values associated with events. The predictive values may be used to determine the scoring of the output.

In embodiments, scoring may be based on a similarity measure to one or more interest models. In embodiments, several or even hundreds or thousands of models may be created based on previously collected behavior data and known interest. The previously collected data may be used to build a model that may predict decisions, activities, behavior, and the like of a person or a category of people. In embodiments, captured data may be used by each model to make predictions about future actions, decisions, outcomes, types of activities, the like. The accuracy of the prediction of each model for the behavioral data of a user may be used to assign a score to each of the models that reflect the accuracy of each model to predict the behavior of the user. In embodiments, the model with the highest score may be used as reflective of the user's interests and aptitudes.

The devices may and further provide suggestions to a user using a suggestion engine 310 based on the scoring from the scoring engine 304. Suggestions may rely on one or more knowledge or models determined from training data and other models.

Figure 4:
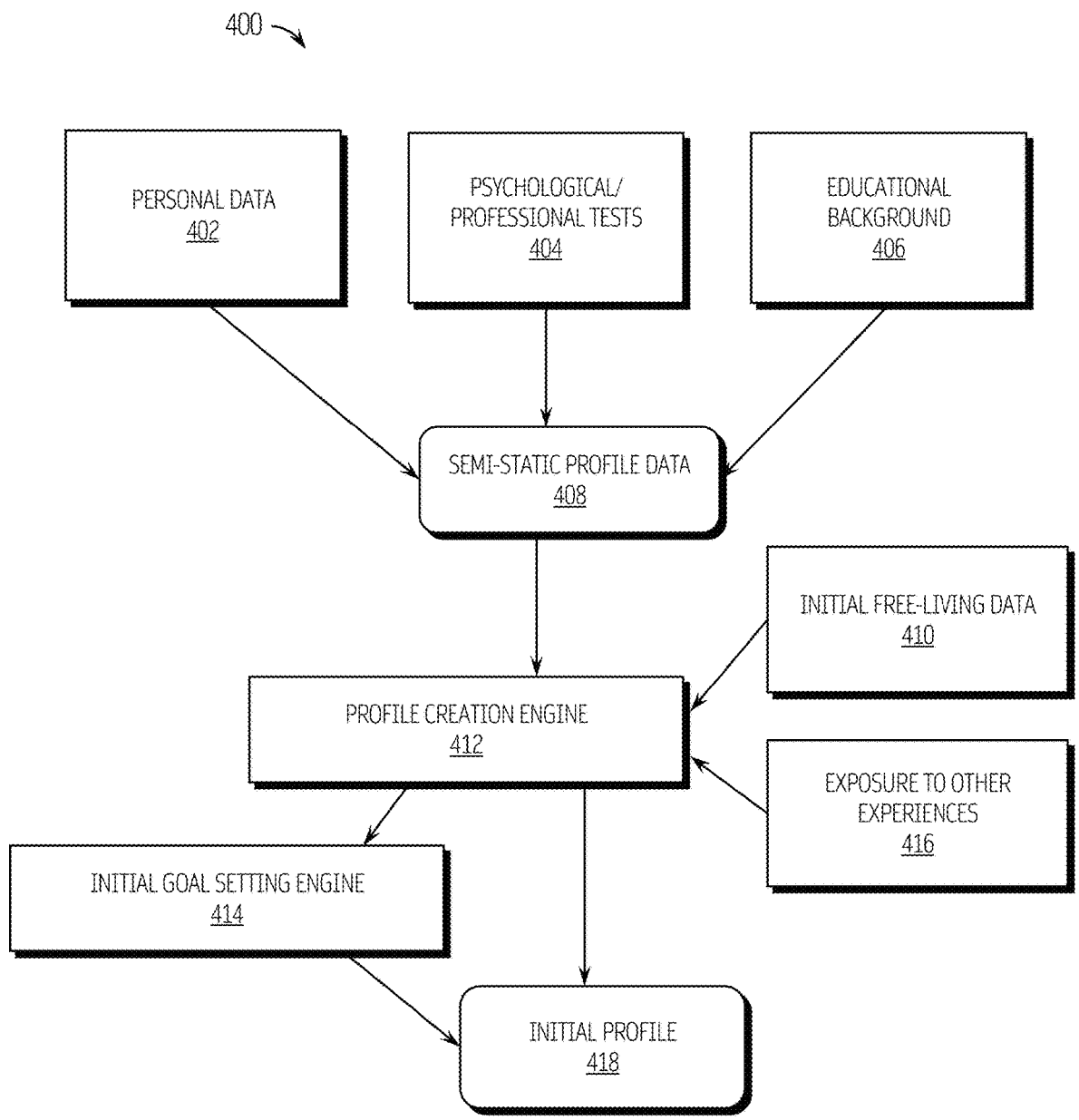
FIG. 4 depicts aspects of a profile module configured for generating a user profile for one or more users.

FIG. 4 depicts aspects of a profile module 400 for generating a user profile for one or more users. In embodiments, profiles may be created for each individual user. The individualized profiles may be tailored to the personal data, history, experiences, goals, and the like of each user. The profile module 400 may be structured to initialize and populate a user profile from data obtained about the user and/or data associated with the user. The profile module 400 may be structured to generate an initial semi-static profile data 408. The initial semi-static profile data 408 may be generated at the initial enrollment of the user before experiences are suggested to the user. The initial semi-static profile data 408 may be an agglomeration of data about the user. In some cases, the initial semi-static profile data 408 may be a distilled agglomeration of data about the user, where agglomerated data may be processed to identify or predict categories or characteristics about the user.

The initial semi-static profile data 408 may be based on and/or derived from personal data 402 for the user. The personal data 402 may be received from one or more databases (public profile, social media, public records, etc.) or directly from the user (such as during initial enrollment). Personal data 402 may include one or more aspects such as gender, age, number of siblings, marital status, parent engagement, social-economic status, and the like. The initial semi-static profile data 408 may be based on and/or derived from educational background 406 for the user. The educational background 406 may be received from one or more databases (public profile, social media, public records, etc.) or directly from the user. Educational background 406 may include one or more aspects of family educational history, professions of family members, school grades, honors/awards, course choices, language skills, non-academic skills such as music or art, behavior awareness, self-knowledge, and the like. The initial semi-static profile data 408 may be based on and/or derived from psychological and/or professional tests 404 for the user. The Professional tests 404 may be received from one or more databases or directly from the user. Professional tests 404 may include one or more aspects such as results from tests or assessments that provide an indication or rating related to risk-taking metrics, introversion, personality, fear of the unknown, family attachment or expectations, professional goals (such as financial security, social service, etc.).

In embodiments, the initial semi-static profile data 408 may be periodically updated according to the availability of new data or changes to the data. In embodiments, the initial semi-static profile data 408 may include a history of changes of the data. The initial semi-static profile data 408 may be structured as a database or any other appropriate data structure for capturing initial semi-static data about the user.

The profile module 400 may include a profile creation engine 412 that further processes the initial semi-static profile data 408 with additional data (initial free-living data 410 and data related to exposure to other experiences 416) to generate the initial profile 418 for the user. In embodiments, initial free-living data 410 may be based on and/or derived from social media posts, cover letters, writings from the user and may include aspects related to previous travel, activities, and/or experiences. In embodiments, exposure to other experiences 416 may be based on and/or derived from social media data and may include aspects such as cultural diversity of friends, experiences, breadth of a social network, professional activities, and the like. Exposure to other experiences 416 may include an analysis of the types of posts (from other users, advertisers, etc.) the user is receiving on their social media platforms, and the posts may be analyzed for their relative diversity.

The profile module 400 may further include an initial goal-setting engine 414. The initial goal-setting engine 414 may generate a set of an initial set of goals that are saved with the initial profile 418 or tracked separately from the initial profile 418. The initial goal-setting engine 414 may receive data from the profile creation engine 412 related to initial goals or trajectories derived from the initial data. The goals derived from the initial goal-setting engine 414 may include one or more professional goals, educational goals, cultural goals, and the like.

The initial profile 418 may be used as the starting point for the system and may be refined as the system receives more information about the user.

In embodiments, the initial profile 418 may be generated for each user. In some cases, depending on the amount of data (such as data from 402, 404, 406, 410, 416) is available, the initial profile may be based on a generic template data configured and initialized with generic data based on a basic user information such as age or gender.

In embodiments, the profile creation engine 412 may process the input data (such as data from 402, 404, 406, 410, 416) and generate a multidimensional feature space based on the data that captures the statistical mapping and/or significance of each data item in relation to one or more (in some cases thousands or more) categories of information about the user. The initial profile 418 may capture the data and include one or more vectors that capture the derived data from the profile creation engine 412.

In embodiments, the profile creation engine 412 may capture aspects of data (402, 404, 406, 410, 416) with respect to a plurality of dimensions. In one example, the plurality of dimensions may include aspects of personal, professional, and or cultural mappings of each data. The initial profile 418 may include a mapping of each data in the profile with respect to the plurality of dimensions. In embodiments, the mapping of profile data to the plurality of dimensions may be used to identify a breadth of the initial profile of the user. In some embodiments, mapping of profile data to the plurality of dimensions may be used to identify the average mapping of the profile data with respect to the plurality of dimensions.

In one example, input data (such as data from 402, 404, 406, 410, 416) may be processed to determine personal, professional, or cultural characteristics. Determining personal, professional, and cultural characteristics may include determining one or more metrics for each of the characteristics. Processing of the data may include determining labels associated with the data. Labels may be generated from descriptions associated with the data or words associated with the data. In one example, input data from a social network post may include words that describe the activity. The words associated with the data may be mapped to one or more categories of words and concepts using a natural language processing (NLP) language mapping model. The categories of words may be associated with one or more personal, professional, or cultural characteristics. In some cases, identified words may be associated with one or more scores or values for each of the personal, professional, or cultural characteristics, and the metrics for each of the characteristics may include one or more of a sum of the scores, average of the scores, standard deviation of the scores, and the like. The model may be trained to determine labels and map the labels to categories and scores using one or more corpora of activities and/or using one or more publicly available NLP corpora.

The labels associated with the input data may be retrieved labels/groupings. Social labels might include social gathering, mentor experience, individual activity. Labels might also include the intensity of involvement, including duration of time spent, choice among presented activities, etc. Each activity may have professional labels from a corpus of professional categories (biology, economics, politics, art, music, etc.). Each activity can have cultural labels (i.e., race, ethnicity, regional distinction (country, suburban/urban/rural, etc.) affinity group (organized by interests, proximity, goals, etc.), language groups, and the like).

In embodiments, dimensional reduction techniques may be applied so that input data represented with labels can be compared to each other as well as scored for their quantitative impact on each label. The system may learn from the activities of each individual and update one or more scores for the personal, professional, or cultural characteristics based on a history of activities. The similarity of input data may be represented as the overlap in a reduced space using standard dimensional reduction techniques such as singular value decomposition, autoencoders, or even temporal embedding of a series using the technology of word-to-vec modeling. In embodiments, as data is gathered from individuals, this data may be more heavily weighted in producing these reduced dimensional representations.

In another example, metrics associated with personal characteristics may include data from surveys, psychological tests, personal history, and user's interactions with the system. In embodiments, the temporal history of the user's interactions with the system may be further to define the metrics. The data on the interactions may include the duration of interactions, any labels assigned to the interactions, and the social context of the interactions.

In another example, metrics associated with personal characteristics may include a measure of a user's ability to take on unfamiliar tasks. In one example, the measure may be defined as a distance between different tasks.

Figure 5:
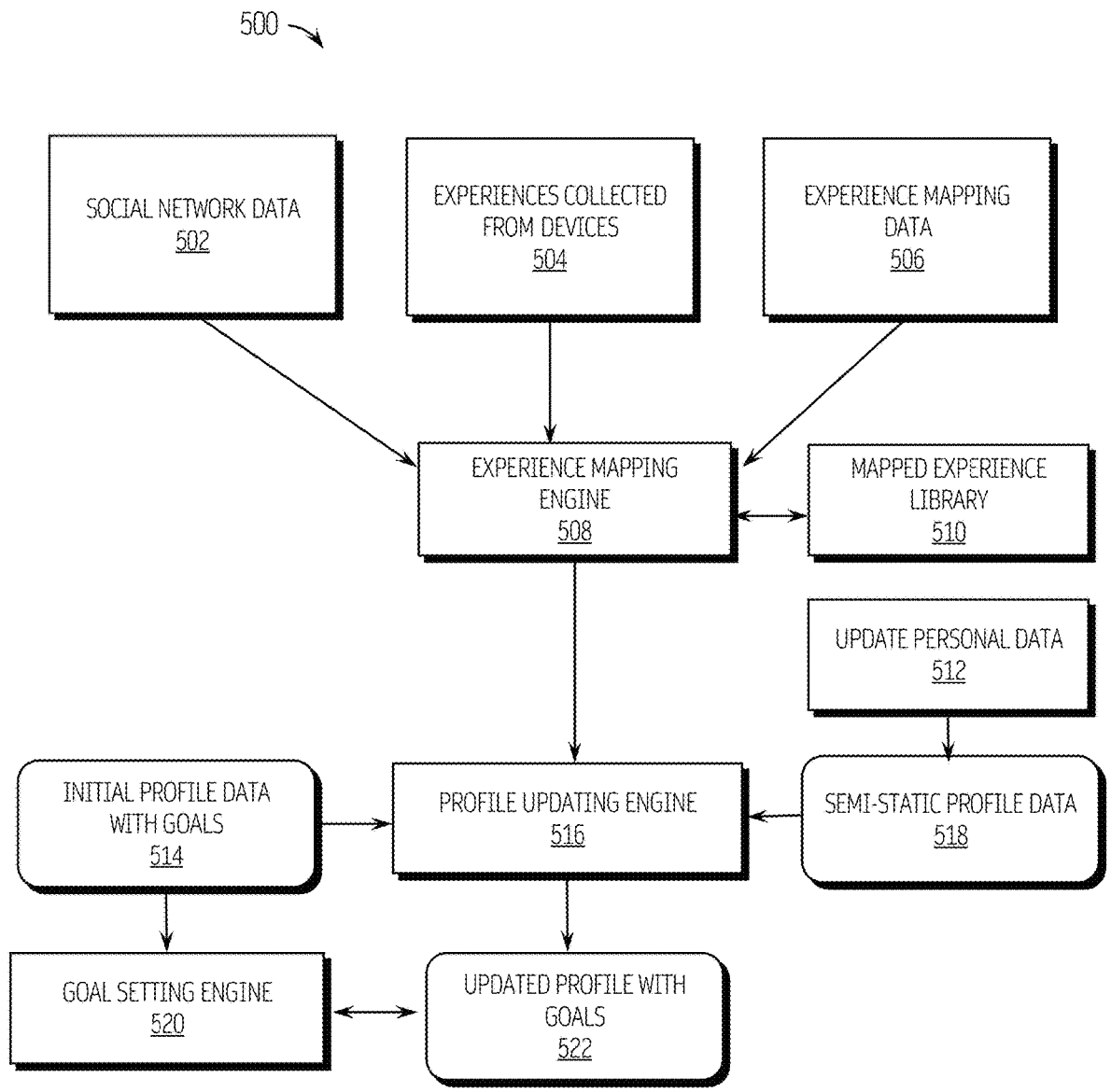
FIG. 5 depicts aspects of an updating module configured for free-living data collection and updating of profile.

FIG. 5 depicts aspects of an updating module 500 configured for free-living data collection and updating of profile. In embodiments, the updating module 500 may process free-living data and update one or more of the profile data of the user and/or goals for the user. The updating module 500 may include an experience mapping engine 508. The experience mapping engine 508 may process free-living data associated with a user. Free-living data may be received or originate from social network data 502. The social network data 502 may include posts, pictures, videos, location data, metadata, and the like from the user and/or other users related to the events and experiences of the user. Free-living data may be received or originate from devices 504. Devices 504 may include software for tracking the activities of a user. Devices 504 may provide data related to location, activity (motion, user status from biosensors, etc.), photos, images, and the like. Additional data may be received that provides experience mapping data 506. The experience mapping data 506 may provide additional information about events, movies, activities, locations, and the like that were identified from the social network data 502 and devices 504.

The experience mapping data 506 may be received in response to a query to one or more databases or search engines. The experience mapping engine 508 may analyze received data and identify experiences in the data and further associate the experiences with aspects related to personal, professional, and/or cultural characteristics.

The experience mapping engine 508 may further receive data from the mapped experience library 510. The mapped experience library 510 may include mappings or embeddings for experiences detected by the experience mapping engine 508 in the free-living data from social network data 502 and/or devices 504. The mapped experience library 510 may provide a vector for each identified experience by the experience mapping engine 508 the captures the personal, professional, and/or cultural aspects of the experience. The mapped experience library 510 may provide a mapping of each experience into a plurality of dimensions related to a plurality of categories, subjects, and the like. In embodiments, the mapped experience library 510 may provide a mapping of each experience with respect to a plurality of dimensions such as personal, professional, and cultural dimensions.

The updating module 500 may further include the profile updating engine 516. The profile updating engine 516 may receive data from the experience mapping engine 508 and generate updated profiles for a user. The profile updating engine 516 may additionally receive the semi-static profile data 518 and initial profile data 514 to generate an updated profile 522. In embodiments, the updating module 500 may further include a goal-setting engine 520 to generate goals for a user. The goal-setting engine 520 may be configured to identify goals from the updated profile 522. The goals may be automatically identified based on aspects such as the breadth of profile data, depth of profile data, and the like. The goals may be automatically identified by evaluating the profile and experiences of the user with respect to the plurality of dimensions of data. In embodiments, goals may be generated based at least in part on the locations of the experiences/locations with respect to the plurality of dimensions.

In one example, the experience mapping engine 508 may update a user profile according to the personal, professional, and cultural characteristics and scores associated with captured data. In embodiments, scores may be updated according to determined labels determined for the data. Scores may be updated according to the current values and rates of change of the current values. For example, if an individual has shown that they are very interested in exploring Indian culture through their activities, not only will their cultural metrics be higher, but they will also show a trajectory of improvement.

Figure 6:
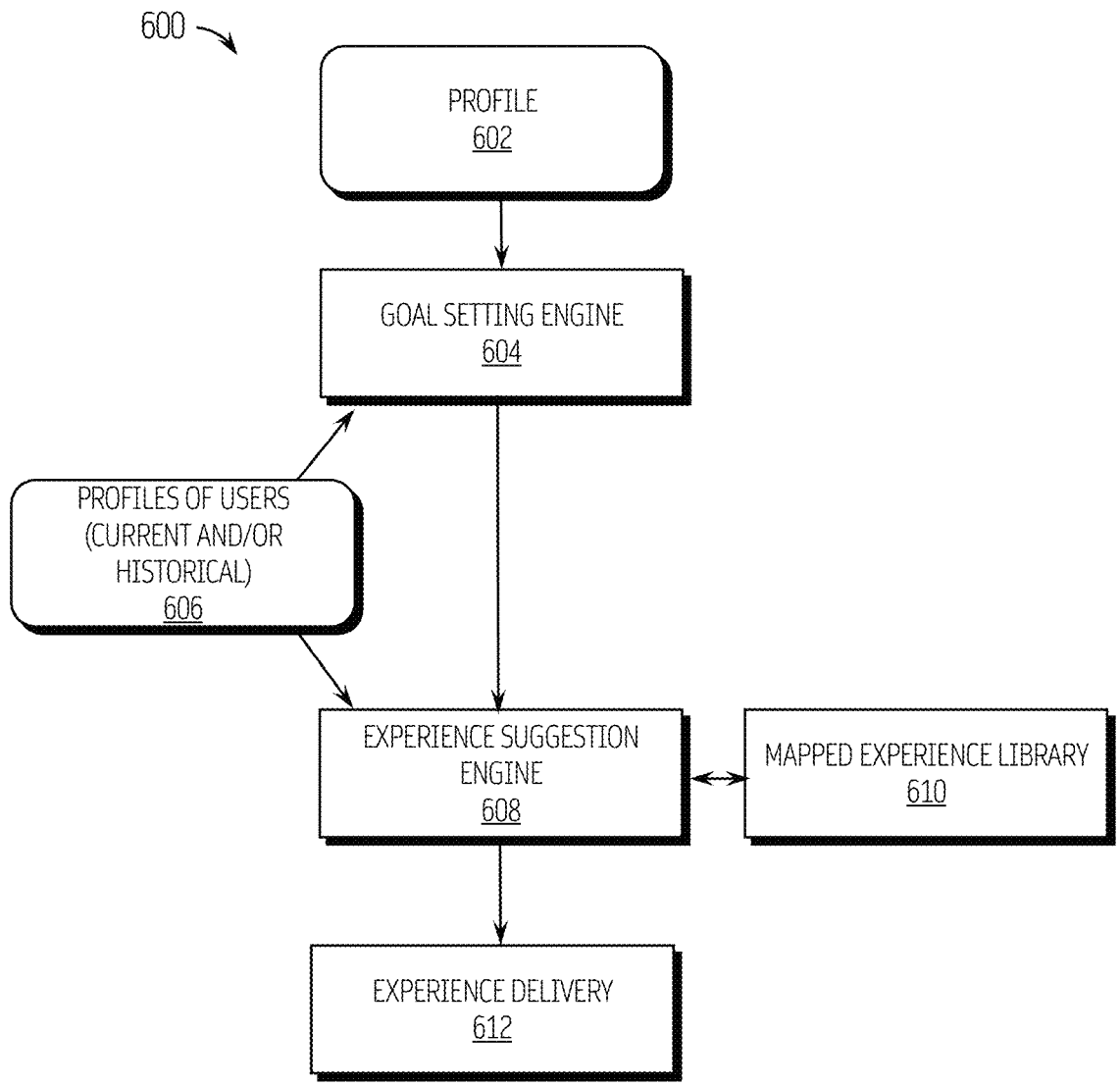
FIG. 6 depicts aspects of an experience delivery module configured to deliver experience suggestions.

FIG. 6 depicts aspects of an experience delivery module 600. In embodiments, the experience delivery module 600 may be configured to determine and deliver suggestions for experiences to the user. In embodiments, the experience delivery module 600 may include a goal-setting engine 604 that receives profile data 602 of the user and may additionally receive profiles of other current or historical users 606. In embodiments, the goal-setting engine 604 may be the same goal-setting engine 520 in the updating module 500. The goal-setting engine 604 may further refine goals based on goals from other profiles of other current or historical users 606. The experience delivery module 600 may further include an experience suggestion engine 608 that may process the goals from the goal-setting engine 604 and determine one or more experience suggestions that may be provided to the user via experience delivery 612 such as email, text, voice memo, and the like. The experience suggestion engine 608 may suggest experiences based on the goals identified for the user. In embodiments, the experience suggestion engine 608 may further receive data from the mapped experience library 610. The mapped experience library 610 may be the same mapped experience library as in the updating module 500.

In embodiments, the experience delivery 612 may include real-time delivery of suggestions for experiences based on current activity (such as captured from social medial or user devices), user location, user choices, and the like. The experience delivery 612 may receive user feedback regarding suggested experiences for which the user may reject the suggestions, modify the suggestions, participate in the experience, and the like.

Figure 7:
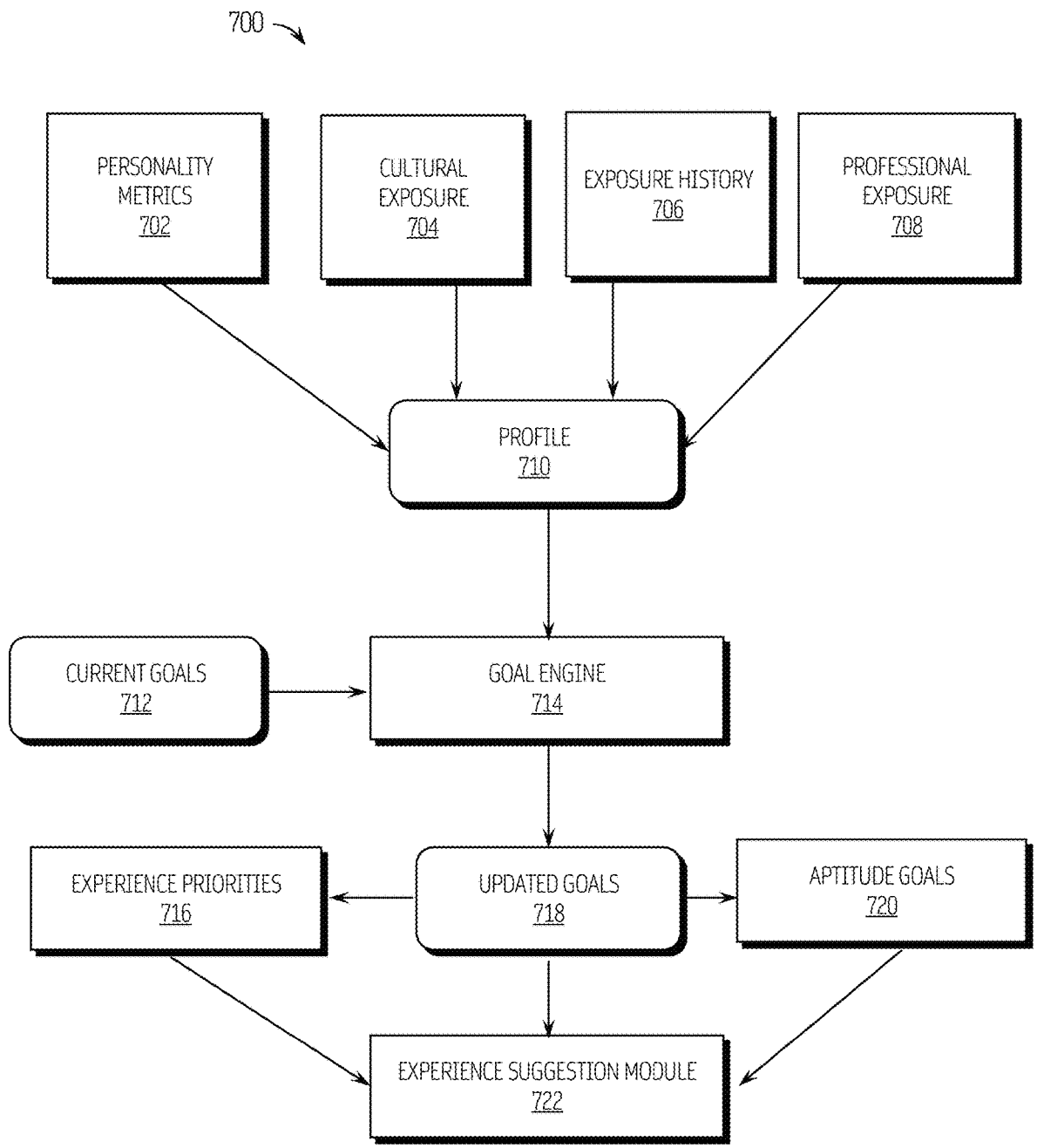
FIG. 7 depicts further aspects of a goal-generating module configured to generate goals for a user.

FIG. 7 depicts further aspects of a goal-generating module 700 configured to generate goals for a user. The goal-generating module 700 may include a goal engine 714 that may be configured to receive profile data 710. The profile data 710 may include data captured from free-living data and other sources and may include personality metrics 702, history or cultural exposure 704, professional exposure 708, and a history of other exposures 706. The goal engine 714 may process the profile data 710 and current goals 712 by the user and generate updated goals 718 that may be used by the experience suggestion module 722. The updated goals may be further categorized into aptitude goals 720 and experience priorities 716. The aptitude goals 720 and the experience priorities 716 may further be used by the experience suggestion module 722.

In embodiments, the goal engine 714 may generate updated goals 718 based at least in part on the coverage of the plurality of dimensions of the profile data 710. In embodiments, the goal engine 714 may evaluate the profile data 710 with respect to a plurality of dimensions (such as aspects related to personal, professional, and/or cultural considerations) and evaluate how the multidimensional space of covered by the profile data 710 and/or previous experiences. In embodiments, the goals may be based on the distribution of profile data 710 in the plurality of dimensions. For example, for profile data 710 that shows a clustering within the plurality of dimensions within a specific area of the plurality of dimensions, the goal engine 714 may generate goals that correspond to experiences that map to other areas of the plurality of dimensions that are not represented in the profile data 710.

In one example, the goal engine may be configured with an overall goal optimization function. The function may be configured to initially optimize overall PPC growth with the weighting of the function in each dimension chosen to be similar and or equal. As data is collected, dimensions with high influenceability may be identified, and the influenceability may be calibrated via this data. As data is collected, the optimization function may be modified to focus goals on the influenceable dimensions. In another example, s data is collected, the optimization function may be modified to focus goals on the influenceable dimensions and also maintain dimensional variation. Example functional form might be a sum of squares in each dimension with the overall value normalized by min/max values. The weighing of each dimension may be updated subject to a constraint (such as an entropy variable) that maximizes the inclusion of multiple dimensions.

Figure 8:
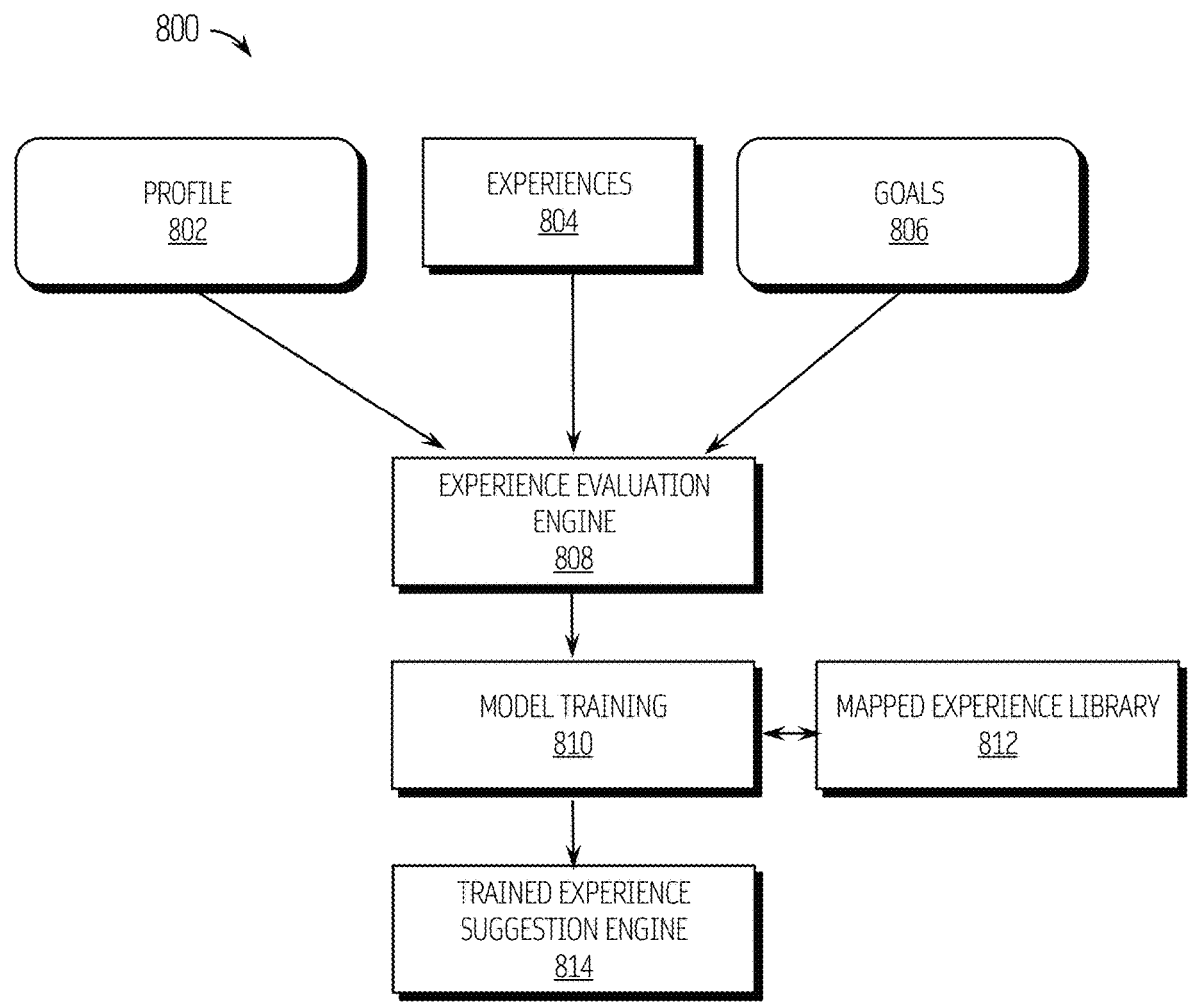
FIG. 8 depicts aspects of an experience suggestion module configured to identify experiences for the user.

FIG. 8 depicts further aspects of an experience suggestion module 800 configured to identify experiences for the user. The experience suggestion module 800 may include an experience evaluation engine 808 that is configured to receive profile data 802, previous experience data 804 for a user, and goals 806 generated for the user (such as goals generated by goal generating module 700). The experience suggestion module 800 may be configured to provide experience suggestions based on a trained model. The experience suggestion module 800 may include a model training component 810 configured to process the mapped experience library 812 and generate a trained experience suggestion engine 814.

In embodiments, the training of the experience suggestion engine 814 may be configured to identify mappings and/or embeddings of each experience with respect to a plurality of dimensions. In embodiments, the plurality of dimensions may include personal, professional, and cultural aspects. The trained experience suggestion engine 814 may be structured to generate a multidimensional vector for each experience wherein each value of the vector provides a mapping or an embedding of the experience with respect to each of the dimensions. In one example, the trained experience suggestion engine 814 may generate a three-dimensional vector wherein the values of the vector provide mapping and/or embedding with respect to personal, professional, and cultural dimensions. In embodiments, model training may include supervised and unsupervised training. Model training component 810 may be trained using experiences that are labeled with respect to a plurality of dimensions. In embodiments, model training component 810 may be trained using unlabeled experiences or statistical analysis of data related to previously suggested experiences.

In embodiments, experience suggestion engine 808 may be configured to synthesize suggestions to identify new experiences tailored to a user. The experience suggestion engine 808 may suggest experiences according to comparison against the PPC goals for the individual. The suggested experiences may be measured against the distance from the cultural baseline for that individual. The distance from the baseline may be compared to a calibrated ability for the individual to engage with activities far from their baseline. Activities will be chosen to maximize the potential PPC scores for the individual (positive) and not exceed the individual's calibrated tolerance for new activities (a negative). The experience suggestion engine may be configured such that two calculated values are balanced to score a suggested experience for an individual.

The experience suggestion engine 808 may generate suggestions based on the similarity of experiences. In one example, similarity may be defined according to dimensional reduction. In another example, similarity may be defined according to a representation in a knowledge graph. Co-occurrence in this knowledge graph space may define the similarity of activities. One-step away co-occurrence may also define a new type of similarity. Each experience may be linked in this graph to each other experience via their similarity in the high dimensional space. In some embodiments, similarity may be characterized by PPC scores.

In one example, the experience suggestion engine 808 may identify experiences to increase the professional growth for an individual. Suggested experiences may be selected that encourage a profession, or new professions may be identified. In one example, as a user tries new experiences, they might choose experiences that interleaf multiple professional measures. User interest may be used as data that links these professional measures. This data linking may create a new measure for a new profession. This new measure can be identified via co-occurrence and clustering techniques in the space of professional dimensions where each activity has a professional label, and the professional labels are gathered from a standard corpus. Co-occurrence of professional areas based on activities (both biology and movie) may be used to identify new professions. Co-occurrence of professional activities for an individual may also identify new professions (i.e., the individual is drawn to both biology and movie-based activities separately, a new profession of biological movie-making/designing is defined).

Figure 9:
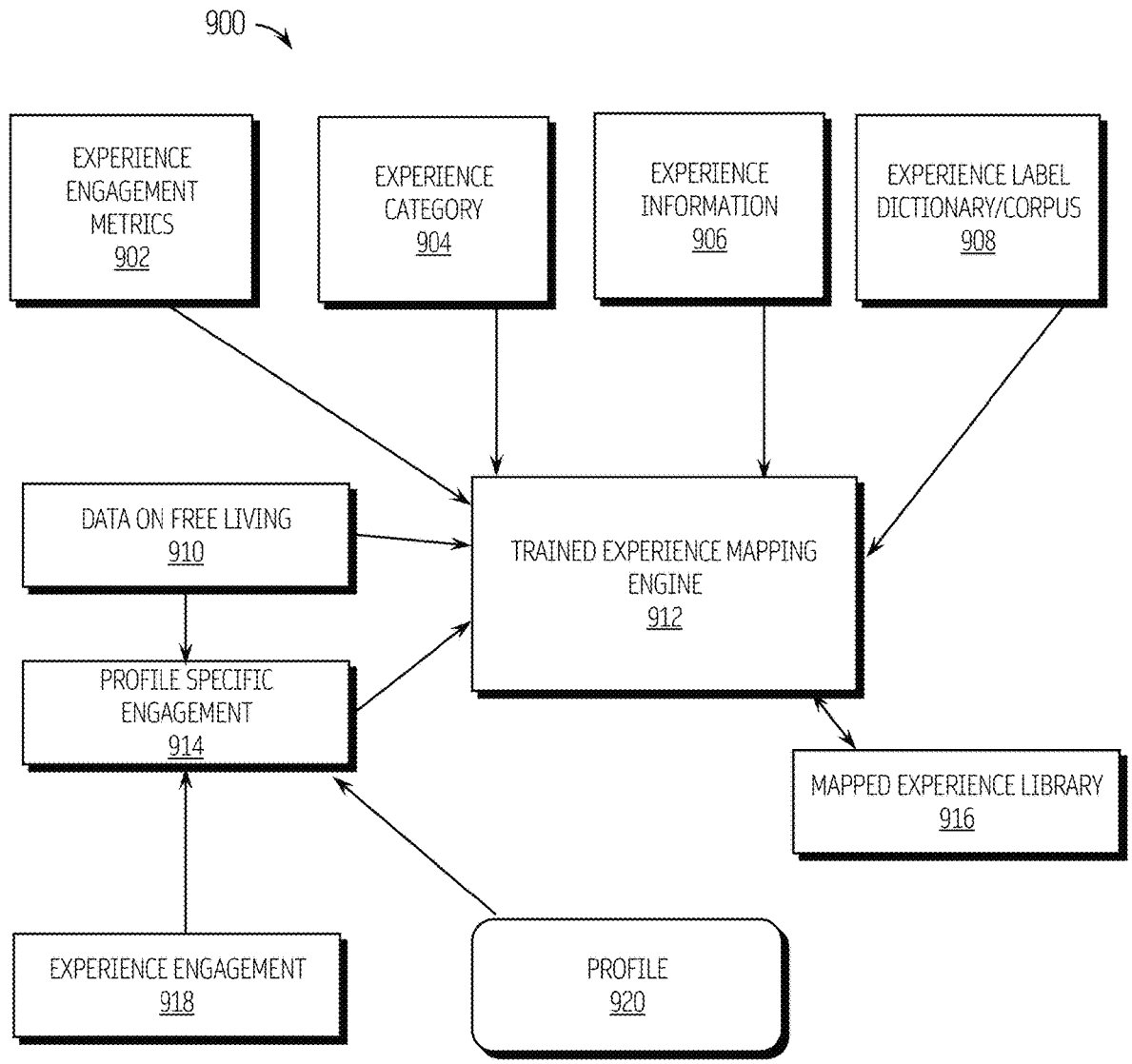
FIG. 9 depicts aspects of an experience mapping module configured to map an experience into a plurality of dimensions.

FIG. 9 depicts aspects of an experience mapping module 900 configured to map an experience into a plurality of dimensions. In embodiments, the experience mapping module 900 may be configured to map each experience into personal, professional, and cultural dimensions. The experience mapping module 900 may include a trained model that may be used to identify a plurality of dimensions for each experience. The trained experience mapping engine 912 may be configured to generate mapping for an experience such that experiences that have similar personal, professional, and/or cultural values may have mapping values that are close to each other. The trained experience mapping engine 912 may be refined and trained periodically and/or continually using supervised and unsupervised techniques. In one example, the trained experience mapping engine 912 may be refined and trained using experience engagement metrics 902, experience categories 904, experience information 906, and experience label dictionary/corpus 908. The experience engagement metrics 902 may include aspects of engagement from the user and may include data related to if the user was an active or a passive participant in the experience, if the user created or managed the activity, and the like. The experience information 906 may include labels directed aspects such as distance from home, country, language, individual or group activity, the age distribution for activity, time spent, frequency, and the like. The experience categories 904 may include categories for each experience such as related to school, social, cultural, mentorship, and the like. The corpus 908 may provide additional information about an experience related to the content associated with the experience.

In embodiments, the trained experience mapping engine 912 may further receive data on free-living 910 (such as data from social networks, experiences, groups), profile-specific engagement data 914 (distances from other experiences in the plurality of dimensions, engagement modality, and the like), profile 920, and the mapped experience library 916 to identify mapping of experiences. In embodiments, historical data of experience engagement 918 (data gathered about what the user liked, avoided, selected, etc.) for previous experience suggestions.

Figure 10:
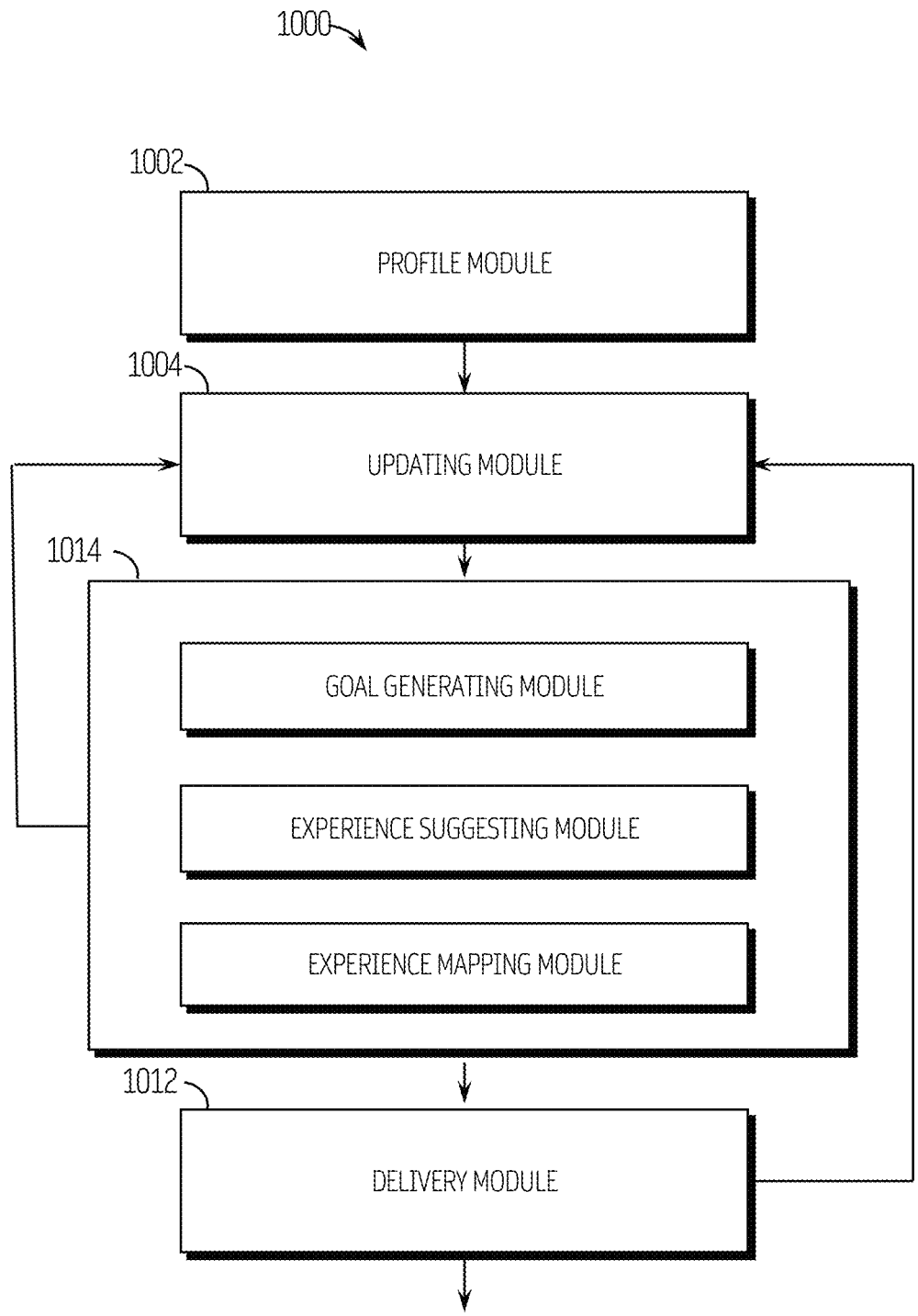
FIG. 10 depicts aspects of a system for delivering experience suggestions to a user.

FIG. 10 depicts aspects of a system 1000 for delivering experience suggestions to a user. The system 1000 may include a profile module 1002, which may be the profile module 400, described with respect to FIG. 4, for initializing and populating a user profile. The system 1000 may further include an updating module 1004, which may be the updating module 500, described with respect to FIG. 5, for updating the user profile according to the activity of the user. The system 1000 may further include a module for generating goals and suggesting experiences for user 1014, which may include the goal generating module 700 described with respect to FIG. 7, experience suggestion module 800 described with respect to FIG. 8, and the experience mapping module 900 described with respect to FIG. 9. The experience suggestions may be provided to a user using a delivery module 1012, which may be the experience delivery module 600 described with respect to FIG. 6. Feedback between the modules may continuously or periodically update the profile, experiences, and goals of the user, as well as the models used to identify goals and experiences as new data is available from the user, devices, or other sources. In embodiments, the modules (1002, 1004, 1014, 1012) may be implemented as circuits on dedicated or programmable hardware devices.

Figure 11:
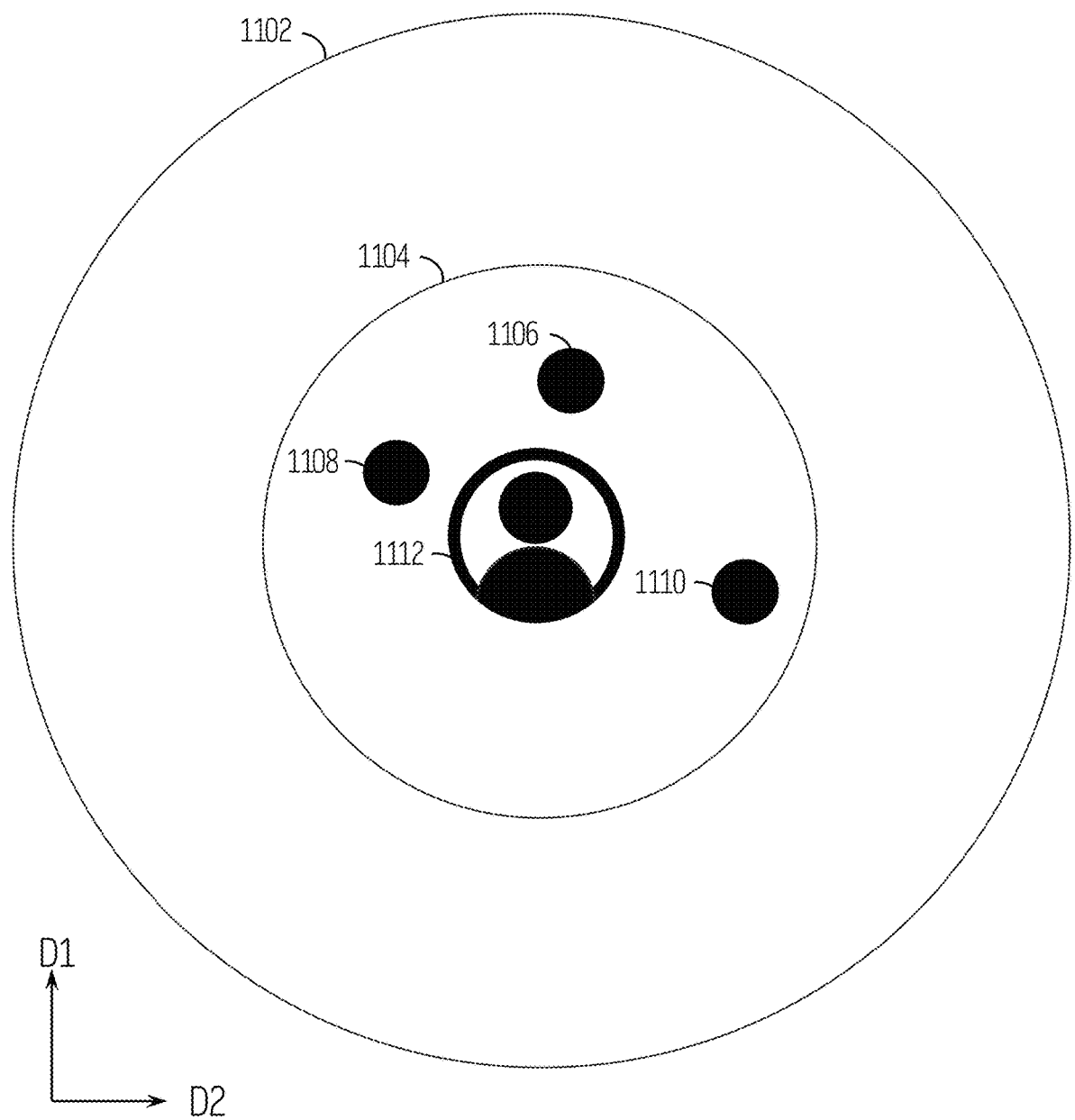
FIGS. 11-12 depict graphical views of aspects of experience tracking and suggestions.
Figure 12:
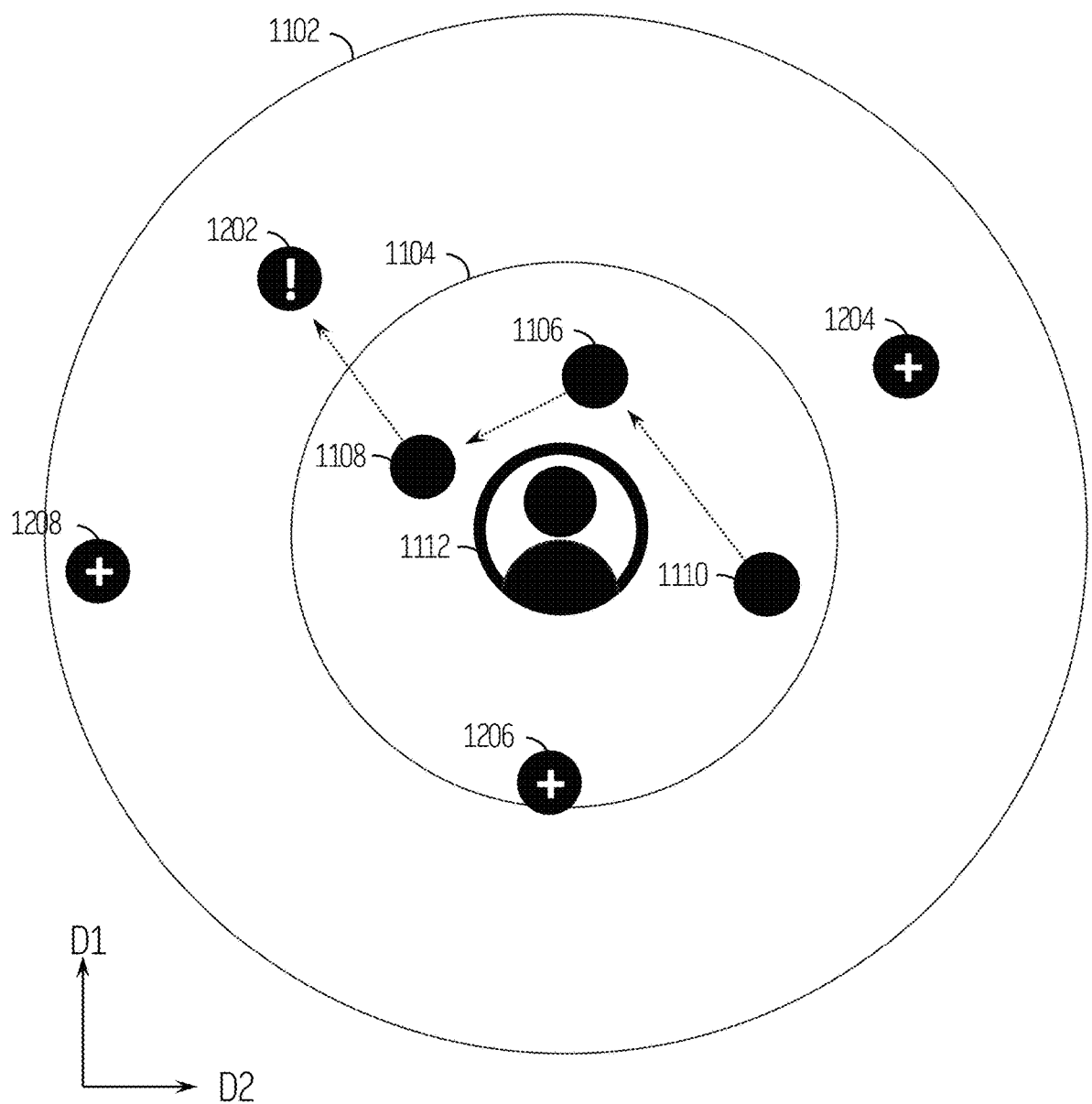

FIGS. 11-12 show a graphical view of aspects of experience tracking and suggestions. FIG. 11 shows a graphical view of a profile 1112 that includes elements that represent experiences of the user 1108, 1106, and 1110 that are mapped into a two-dimensional space with dimensions D1 and D2. FIG. 11 shows an example of profile data that may be generated by a profile module 400. In embodiments, the dimensionality of the space may be any dimension such as 3 or more dimensions but is depicted in FIG. 11 with two dimensions for clarity. In one example, a three-dimensional mapping may be configured such that each dimension represents one of a personal, professional, or cultural aspect. The location of the elements relating to the experiences 1106, 1108, and 1110 may relate to the relative values in the plurality of dimensions. The location of the elements represents the characteristics of the experiences of the user relative to the two dimensions D1 and D2. The spread or the bounds of the experiences 1104 may represent the breadth of the user experiences. In embodiments, the overall profile data 1112 (such as an average of all the experiences with respect to all the experience data) may be further represented in the multidimensional space.

In embodiments, the spread and relative locations of the profile 1112 and experiences 1106. 1108, 1110 may be used to identify goals for the user, such as by the goal generating module 700. In an example where the experiences are clustered together in one location, goals may be determined, such as to increase the spread of the new experiences. In another example, where experiences are clustered in one dimension while spread out in a second dimension, goals may be generated that aim to increase more breadth of the experiences in the second dimension. Suggestions for experiences may be provided to the user according to the determined goals using, for example, the experience suggestion module 800. FIG. 12 depicts one example where new experience suggestions 1202, 1204, 1208 may be provided according to a goal of increasing the breadth of user experiences from the first breadth 1104 to a wider breadth 1102. In embodiments, a user may select one or more of the suggested experiences, such as experience 1202. The sequence of the experiences (denoted by the dotted line between elements 1110, 1106, 1108, and 1202) may be used to identify the trajectory of the user. In embodiments, the sequence of the experiences may identify the evolution of the user and may be used to identify new experiences for the user.

The methods and systems described herein may be deployed in part or in whole through a machine that executes computer software, program codes, and/or instructions on a processor. The present disclosure may be implemented as a method on the machine, as a system or apparatus as part of or in relation to the machine, or as a computer program product embodied in a computer readable medium executing on one or more of the machines. In embodiments, the processor may be part of a server, cloud server, client, network infrastructure, mobile computing platform, stationary computing platform, or other computing platform. A processor may be any kind of computational or processing device capable of executing program instructions, codes, binary instructions, and the like. The processor may be or may include a signal processor, digital processor, embedded processor, microprocessor, or any variant such as a co-processor (math co-processor, graphic co-processor, communication co-processor, and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions, and the like described herein may be implemented in one or more thread. The thread may spawn other threads that may have assigned priorities associated with them; the processor may execute these threads based on priority or any other order based on instructions provided in the program code. The processor, or any machine utilizing one, may include non-transitory memory that stores methods, codes, instructions, and programs as described herein and elsewhere. The processor may access a non-transitory storage medium through an interface that may store methods, codes, and instructions as described herein and elsewhere. The storage medium associated with the processor for storing methods, programs, codes, program instructions, or other type of instructions capable of being executed by the computing or processing device may include but may not be limited to one or more of a CD-ROM, DVD, memory, hard disk, flash drive, RAM, ROM, cache, and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server, cloud server, and other variants such as secondary server, host server, distributed server, and the like. The server may include one or more of memories, processors, computer readable transitory and/or non-transitory media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, social networks, and the like. Additionally, this coupling and/or connection may facilitate remote execution of program across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code, and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client, and other variants such as secondary client, host client, distributed client, and the like. The client may include one or more of memories, processors, computer readable transitory and/or non-transitory media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers, and the like. Additionally, this coupling and/or connection may facilitate remote execution of a program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code, and/or instructions. A central repository may provide program instructions to be executed on different devices. In this implementation, the remote repository may act as a storage medium for program code, instructions, and programs.

In embodiments, one or more of the controllers, circuits, systems, data collectors, storage systems, network elements, or the like as described throughout this disclosure may be embodied in or on an integrated circuit, such as an analog, digital, or mixed signal circuit, such as a microprocessor, a programmable logic controller, an application-specific integrated circuit, a field programmable gate array, or other circuit, such as embodied on one or more chips disposed on one or more circuit boards, such as to provide in hardware (with potentially accelerated speed, energy performance, input-output performance, or the like) one or more of the functions described herein. This may include setting up circuits with up to billions of logic gates, flip-flops, multiplexers, and other circuits in a small space, facilitating high speed processing, low power dissipation, and reduced manufacturing cost compared with board-level integration. In embodiments, a digital IC, typically a microprocessor, digital signal processor, microcontroller, or the like may use Boolean algebra to process digital signals to embody complex logic, such as involved in the circuits, controllers, and other systems described herein. In embodiments, a data collector, an expert system, a storage system, or the like may be embodied as a digital integrated circuit ("IC"), such as a logic IC, memory chip, interface IC (e.g., a level shifter, a serializer, a deserializer, and the like), a power management IC and/or a programmable device; an analog integrated circuit, such as a linear IC, RF IC, or the like, or a mixed signal IC, such as a data acquisition IC (including A/D converters, D/A converter, digital potentiometers) and/or a clock/timing IC.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM, and the like. The processes, methods, program codes, instructions described herein and elsewhere may be executed by one or more of the network infrastructural elements. The methods and systems described herein may be configured for use with any kind of private, community, or hybrid cloud computing network or cloud computing environment, including those which involve features of software as a service ("SaaS"), platform as a service ("PaaS"), and/or infrastructure as a service ("IaaS").

The methods, program codes, and instructions described herein and elsewhere may be implemented on a cellular network having multiple cells. The cellular network may either be frequency division multiple access ("FDMA") network or code division multiple access ("CDMA") network. The cellular network may include mobile devices, cell sites, base stations, repeaters, antennas, towers, and the like. The cell network may be a GSM, GPRS, 3G, EVDO, mesh, or other networks types.

The methods, program codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable transitory and/or non-transitory media that may include: computer components, devices, and recording media that retain digital data used for computing for some interval of time; semiconductor storage known as random access memory ("RAM"); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, stand-alone RAM disks, zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another.

The methods and systems described herein may also transform data representing physical and/or intangible items from one state to another.

The elements described and depicted herein, including in flow charts and block diagrams throughout the Figures, imply logical boundaries between the elements. However, according to software or hardware engineering practices, the depicted elements and the functions thereof may be implemented on machines through computer executable transitory and/or non-transitory media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers, and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps associated therewith, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, methods described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the disclosure has been disclosed in connection with the preferred embodiments shown and described in detail, various modifications and improvements thereon will become readily apparent to those skilled in the art. Accordingly, the spirit and scope of the present disclosure is not to be limited by the foregoing examples, but is to be understood in the broadest sense allowable by law.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure, and does not pose a limitation on the scope of the disclosure unless otherwise claimed. No language in the specification should be construed as indicating any non-claimed element as essential to the practice of the disclosure.

While the foregoing written description enables one skilled in the art to make and use what is considered presently to be the best mode thereof, those skilled in the art will understand and appreciate the existence of variations, combinations, and equivalents of the specific embodiment, method, and examples herein. The disclosure should therefore not be limited by the above described embodiment, method, and examples, but by all embodiments and methods within the scope and spirit of the disclosure.

Any element in a claim that does not explicitly state "means for" performing a specified function, or "step for" performing a specified function, is not to be interpreted as a "means" or "step" clause as specified in 35 USC § 112(f). In particular, any use of "step of" in the claims is not intended to invoke the provision of 35 USC § 112(f).

Persons skilled in the art may appreciate that numerous design configurations may be possible to enjoy the functional benefits of the inventive systems. Thus, given the wide variety of configurations and arrangements of embodiments of the present invention, the scope of the invention is reflected by the breadth of the claims below rather than narrowed by the embodiments described above.

What is claimed is:

1. A computer-implemented method for identifying or developing a potential of a user, the method comprising:
    training, by one or more processors, a machine learning model using a first set of labeled free-living activity data to create a mapping between multidimensional vectors of the first set of free-living activity data and one or more values for personal, professional, and cultural components;
    receiving, by the one or more processors, a second set of free-living activity data of the user captured with one or more electronic devices;
    sequencing, by the one or more processors, the second set of free-living activity data into a first set of multidimensional vectors, wherein a multidimensional vector comprises values for personal, professional, and cultural components of the second set of free-living activity data;
    mapping, using the trained machine learning model, the first set of multidimensional vectors into a multidimensional space of components;
    identifying, based on the mapping, a goal for the user, wherein the identifying comprises:
        determining a distribution of the first set of multidimensional vectors in the multidimensional space of components,
        searching for a gap in the distribution, and
        assigning values for the personal, professional, and cultural components for the goal based on a location of the gap in the multidimensional space of components;
    synthesizing, by the one or more processors, an experience for the user, wherein synthesizing the experience comprises generating multidimensional vectors with values for personal, professional, and cultural components for a set of experiences and selecting the experience based on a similarity score between the values of the components of the experience and the values of the components of the goal; and
    delivering a suggestion of the experience to the user;
    receiving a selection, from the second user, of an experience from the set of experiences; and
    retraining, by the one or more processors, the machine learning model based, at least in part, on the received selection.

2. The method of claim 1, wherein the experience is at least one of an activity, a career path, an educational milestone, or a travel destination.

3. The method of claim 1, further comprising:
    sequencing the experience into a second multidimensional vector;
    mapping the second multidimensional vector into the multidimensional space of criteria; and
    identifying at least one relationship between the mapping of the first multidimensional vector and the mapping of the second multidimensional vector.

4. The method of claim 3, wherein the at least one relationship comprises a distance measure.

5. The method of claim 3, wherein the at least one relationship comprises a relative location of the mappings in the multidimensional space.

6. The method of claim 3, wherein the goal comprises at least one goal relationship between the mapping of the first multidimensional vector and the mapping of the second multidimensional vector.

7. The method of claim 1, further comprising:
receiving user feedback in response to the suggestion of the experience; and
updating the goal based on the user feedback.

8. The method of claim 1, further comprising:
identifying activities in the second set of free-living activity data; and
synthesizing the experience based on the activities.

9. The method of claim 1, wherein the second set of free-living activity data is collected from a wearable device.

10. The method of claim 9, wherein data collected from the wearable device comprises physiological data of the user.

11. The method of claim 1, wherein sequencing the second set of free-living activity data into the first multidimensional vector comprises comparing fee-living data against a library of labeled free-living data.

12. The method of claim 1, further comprising:
synthesizing a second experience for the user;
delivering a suggestion of the second experience to the user;
receiving an indication of a selection between the suggestion of the experience and the suggestion of the second experience; and
updating the goal for the user based on the received indication.

13. The method of claim 1, wherein the second set of free-living activity data comprises a sequence of free-living activities, and wherein synthesizing the experience for the user comprises synthesizing based on the sequence.

14. The method of claim 1, wherein the second set of free-living activity data comprises at least one of: user location, duration of activities, choices between activities, temporal relationship between activities, type of activity, number of other participants in the activity, or level or participation in the activity.

15. The method of claim 1, further comprising:
querying at least one database for activity information associated with the second set of free-living activity data; and
sequencing the second set of free-living activity data into the first multidimensional vector based on the activity information.

16. The method of claim 15, wherein the activity information includes data about a locations associated with the second set of free-living activity data.

17. The method of claim 16, wherein the activity information includes data from social media associated with the second set of free-living activity data.

* * * * *

UNITED STATES PATENT AND TRADEMARK OFFICE
CERTIFICATE OF CORRECTION

PATENT NO. : 12,361,348 B2
APPLICATION NO. : 17/448740
DATED : July 15, 2025
INVENTOR(S) : Kasabach et al.

Page 1 of 1

It is certified that error appears in the above-identified patent and that said Letters Patent is hereby corrected as shown below:

In the Specification

In Column 22, Line 30, delete "808" and insert --814-- therefor

In Column 22, Line 33, delete "808" and insert --814-- therefor

In Column 22, Line 45, delete "808" and insert --814-- therefor

In Column 22, Line 56, delete "808" and insert --814-- therefor

Signed and Sealed this
Twenty-eighth Day of October, 2025

John A. Squires
*Director of the United States Patent and Trademark Office*